US012572232B2

(12) United States Patent
Jeong et al.

(10) Patent No.:  US 12,572,232 B2
(45) Date of Patent:  Mar. 10, 2026

(54) INPUT SENSING PART AND DISPLAY DEVICE INCLUDING THE SAME

(71) Applicant: SAMSUNG DISPLAY CO., LTD., Yongin-si (KR)

(72) Inventors: Yeri Jeong, Suwon-si (KR); Il-Joo Kim, Hwaseong-si (KR); Wonjun Choi, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/826,805

(22) Filed: Sep. 6, 2024

(65) Prior Publication Data

US 2024/0427453 A1      Dec. 26, 2024

Related U.S. Application Data

(63) Continuation of application No. 18/058,695, filed on Nov. 23, 2022, now Pat. No. 12,099,678.

(30) Foreign Application Priority Data

Feb. 24, 2022      (KR) ......................... 10-2022-0024282

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 2203/04111* (2013.01)

(58) Field of Classification Search
CPC .. G06F 3/04164; G06F 3/0446; G06F 3/0412; G06F 2203/04111
See application file for complete search history.

(56) References Cited

U.S. PATENT DOCUMENTS

| | | | |
|---|---|---|---|
| 11,121,193 B2 | 9/2021 | Jeon et al. | |
| 2015/0085456 A1 | 3/2015 | Cok | |
| 2016/0374193 A1 | 12/2016 | Namkung | |
| 2020/0225796 A1 | 7/2020 | Yeh | |
| 2021/0011581 A1* | 1/2021 | Choi | ...................... G06F 3/0443 |
| 2021/0191566 A1* | 6/2021 | Yang | ...................... G06F 3/0446 |
| 2023/0266843 A1 | 8/2023 | Jeong et al. | |

FOREIGN PATENT DOCUMENTS

| | | |
|---|---|---|
| CN | 111651081 A | 9/2020 |
| KR | 10-2040647 B1 | 11/2019 |
| KR | 10-2086622 B1 | 3/2020 |
| KR | 10-2020-0118920 A | 10/2020 |

* cited by examiner

*Primary Examiner* — Peter D McLoone
(74) *Attorney, Agent, or Firm* — F. CHAU & ASSOCIATES, LLC

(57) ABSTRACT

An input sensing part includes a first sensing electrode, a second sensing electrode that crosses the first sensing electrode, a first sensing line electrically connected to the first sensing electrode, a first multi-layer line that is electrically connected to the second sensing electrode and that includes a first line and a second line disposed over the first line, a first single-layer line that extends from one of the first and second lines, and a second single-layer line that is disposed in a different layer from the first single-layer line and electrically connected to the first single-layer line and that has a different line width from the first single-layer line.

21 Claims, 16 Drawing Sheets

INPUT SENSING PART AND DISPLAY DEVICE INCLUDING THE SAME

CROSS-REFERENCE TO RELATED APPLICATIONS

This application is a Continuation of co-pending U.S. patent application Ser. No. 18/058,695, filed on Nov. 23, 2022, which claims priority under 35 U.S.C. § 119 to Korean Patent Application No. 10-2022-0024282, filed on Feb. 24, 2022 in the Korean Intellectual Property Office, the disclosures of which are incorporated by reference herein in their entirety.

TECHNICAL FIELD

The present disclosure relates to a display device and, more specifically, to an input sensing part and a display device including the same.

DISCUSSION OF THE RELATED ART

In general, electronic devices, such as a smart phone, a digital camera, a notebook computer, a car navigation unit, a smart television, and the like, include a display device for displaying an image to a user.

The display device includes a display panel that generates an image and an input sensing part that is disposed on the display panel and that senses an external input such as a touch of a user. The input sensing part includes a plurality of sensing electrodes for sensing the external input and a plurality of sensing lines electrically connected to the sensing electrodes. The sensing electrodes are disposed in an active area of the display device, and the sensing lines are disposed in a non-active area of the display device that is adjacent to the active area.

Drive signals are applied to the sensing electrodes, and changes in capacitances of the sensing electrodes are output as sensing signals. The drive signals and the sensing signals are input and output through the sensing lines.

SUMMARY

An input sensing part includes a first sensing electrode. A second sensing electrode crosses the first sensing electrode. A first sensing line is electrically connected to the first sensing electrode. A first multi-layer line is electrically connected to the second sensing electrode. The first multi-layer line includes a first line and a second line disposed over the first line. A first single-layer line extends from the first line or from the second line. A second single-layer line is disposed in a different layer from that of the first single-layer line and is electrically connected to the first single-layer line. The second single-layer line has a different line width from that of the first single-layer line.

An input sensing part includes a plurality of first sensing electrodes. A plurality of second sensing electrodes cross the first sensing electrodes. A plurality of first sensing lines are electrically connected to the first sensing electrodes. A plurality of first multi-layer lines are electrically connected to the second sensing electrodes. The first multi-layer lines extend in a first direction. A plurality of first single-layer lines are bent from the first multi-layer lines and extend in a second direction crossing the first direction. A plurality of second multi-layer lines extend in the first direction. A plurality of second single-layer lines are bent from the second multi-layer lines and extend in the second direction.

The second single-layer lines are electrically connected to the first single-layer lines. In the second direction, a gap between one side of a bent portion between an $h^{th}$ first multi-layer line and an $h^{th}$ first single-layer line and one side of a bent portion between an $(h+1)^{th}$ first multi-layer line and an $(h+1)^{th}$ first single-layer line is equal in size to a gap between one side of an $h^{th}$ second multi-layer line and one side of an $(h+1)^{th}$ second multi-layer line, where h is a positive integer.

A display device includes a display panel and an input sensing part disposed on the display panel. The input sensing part includes a first sensing electrode. A second sensing electrode crosses the first sensing electrode. A first sensing line is electrically connected to the first sensing electrode. A first multi-layer line is electrically connected to the second sensing electrode. The first multi-layer line includes a first line and a second line disposed over the first line. A first single-layer line extends from the first line or the second line. A second single-layer line is disposed in a different layer from that of the first single-layer line. The second single-layer line is electrically connected to the first single-layer line and has a different line width from the first single-layer line.

BRIEF DESCRIPTION OF THE FIGURES

The above and other objects and features of the present disclosure will become apparent by describing in detail embodiments thereof with reference to the accompanying drawings.

FIG. 19 is a cross-sectional view taken along line A1-A1' illustrated in FIG. 6.

FIG. 20 is a cross-sectional view taken along line A2-A2' illustrated in FIG. 6.

DETAILED DESCRIPTION

Figure 1:
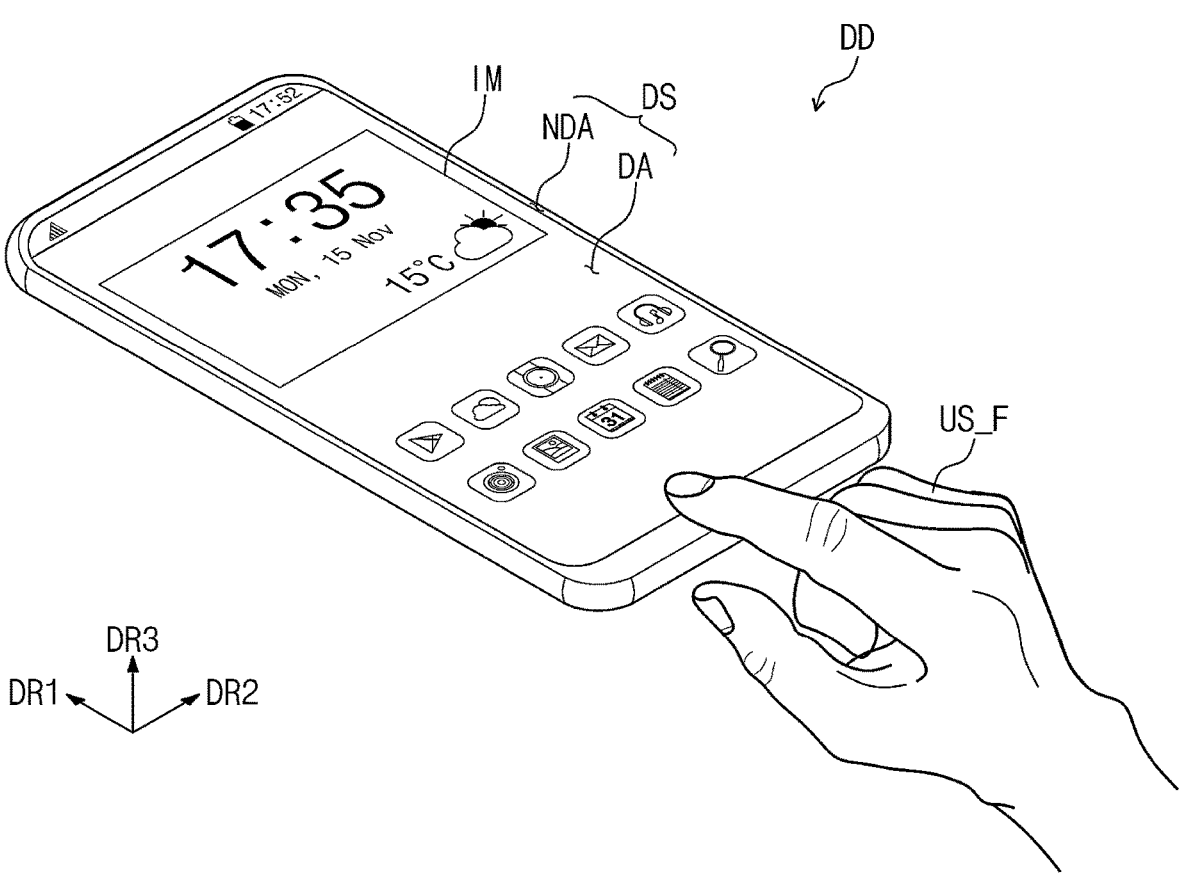
FIG. 1 is a perspective view of a display device according to an embodiment of the present disclosure.

In this specification, when it is mentioned that a component (or, an area, a layer, a part, etc.) is referred to as being "on", "connected to" or "coupled to" another component, this may mean that the component may be directly on, connected to, or coupled to the other component or a third component may be present therebetween.

Identical reference numerals may refer to identical components throughout the specification and the drawings. Additionally, it is to be understood that in the drawings, the relative thicknesses, proportions, angles, and dimensions of components are intended to be drawn to scale for at least one embodiment of the present disclosure, however, changes may be made to these characteristics within the scope of the present disclosure and the present inventive concept is not necessarily limited to the properties shown.

As used herein, the term "and/or" includes all of one or more combinations defined by related components.

Terms such as first, second, and the like may be used to describe various components, but the components should not necessarily be limited by the terms. The terms may be used for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

FIG. 1 is a perspective view of a display device according to an embodiment of the present disclosure.

Referring to FIG. 1, the display device DD, according to an embodiment of the present disclosure, may have a rectangular shape with a pair of long sides extending in a first direction DR1 and a pair of short sides extending in a second direction DR2 crossing the first direction DR1. However, without necessarily being limited thereto, the display device DD may have various shapes such as a circular shape, a polygonal shape, and the like.

Hereinafter, a direction substantially perpendicular to a plane defined by the first direction DR1 and the second direction DR2 is defined as a third direction DR3 As used herein, the expression "when viewed on the plane" or "in a plan view" may mean that it is viewed in the third direction DR3.

The upper surface of the display device DD may be defined as a display surface DS and may have a plane defined by the first direction DR1 and the second direction DR2. Images IM generated by the display device DD may be displayed to a user through the display surface DS. The display device DD may sense a touch of the user's finger US_F on the display device DD.

The display surface DS may include a display area DA and a non-display area NDA at least partially surrounding the display area DA. The display area DA may display an image, and the non-display area NDA might not display an image. The non-display area NDA may at least partially surround the display area DA and may define the border of the display device DD printed in a particular color.

Figure 2:
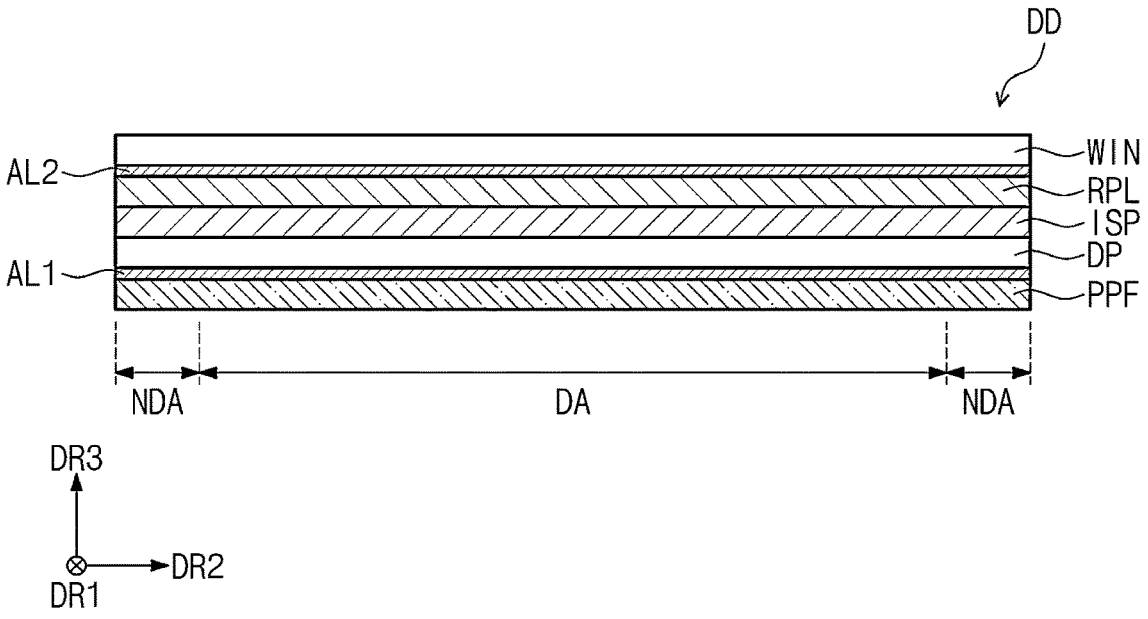
FIG. 2 is a cross-sectional view of the display device illustrated in FIG. 1.

FIG. 2 is a cross-sectional view of the display device illustrated in FIG. 1.

In FIG. 2, a section of the display device DD viewed in the first direction DR1 is illustrated.

Referring to FIG. 2, the display device DD may include a display panel DP, an input sensing part ISP, an anti-reflection layer RPL, a window WIN, a panel protection film PPF, and first and second adhesive layers AL1 and AL2.

The display panel DP may be a flexible display panel. The display panel DP, according to an embodiment of the present disclosure, may be an emissive display panel, but the present disclosure is not necessarily limited thereto. For example, the display panel DP may be an organic light emitting diode (OLED) display panel or an inorganic light emitting display panel. An emissive layer of the organic light emitting diode display panel may contain an organic light emitting material. An emissive layer of the inorganic light emitting display panel may contain quantum dots, quantum rods, and the like. Hereinafter, it will be exemplified that the display panel DP is an organic light emitting diode display panel.

The input sensing part ISP may be disposed on the display panel DP. The input sensing part ISP may include a plurality of sensing parts for sensing an external input in a capacitive manner. The input sensing part ISP may be directly manufactured on the display panel DP during the manufacture of the display device DD. However, without necessarily being limited thereto, the input sensing part ISP may be manufactured as a panel that is separate from the display panel DP and may later be attached to the display panel DP by an adhesive layer.

The anti-reflection layer RPL may be disposed on the input sensing part ISP. The anti-reflection layer RPL may be directly manufactured on the input sensing part ISP during the manufacture of the display device DD. However, without necessarily being limited thereto, the anti-reflection layer RPL may be manufactured as a separate panel and may later be attached to the input sensing layer ISP by an adhesive layer.

The anti-reflection layer RPL may be defined as a film for preventing reflection of external light. The anti-reflection layer RPL may decrease the reflectivity of external light incident toward the display panel DP from above the display device DD. Due to the anti-reflection layer RPL, the external light might not be visible to the user.

When external light travelling toward the display panel DP is reflected from the display panel DP and reflected back to the user, the user may visually recognize the external light, as would be the case for a mirror. To prevent such a phenomenon, the anti-reflection layer RPL may include a plurality of color filters that display the same colors as pixels of the display panel DP.

External light may be filtered in the same colors as those of the pixels by the color filters. In this case, the external light might not be visible to the user. However, without necessarily being limited thereto, the anti-reflection layer RPL may include a phase retarder and/or a polarizer to decrease the reflectivity of external light.

The window WIN may be disposed over the anti-reflection layer RPL. The window WIN may protect the display panel DP, the input sensing part ISP, and the anti-reflection layer RPL from external scratches and impacts.

The panel protection film PPF may be disposed under the display panel DP. The panel protection film PPF may protect the bottom of the display panel DP. The panel protection film PPF may contain a flexible plastic material such as polyethylene terephthalate (PET).

The first adhesive layer AL1 may be disposed between the display panel DP and the panel protection film PPF, and the display panel DP and the panel protection film PPF may be bonded to each other by the first adhesive layer AL1. The second adhesive layer AL2 may be disposed between window WIN and the anti-reflection layer RPL, and the window WIN and the anti-reflection layer RPL may be bonded to each other by the second adhesive layer AL2.

Figure 3:
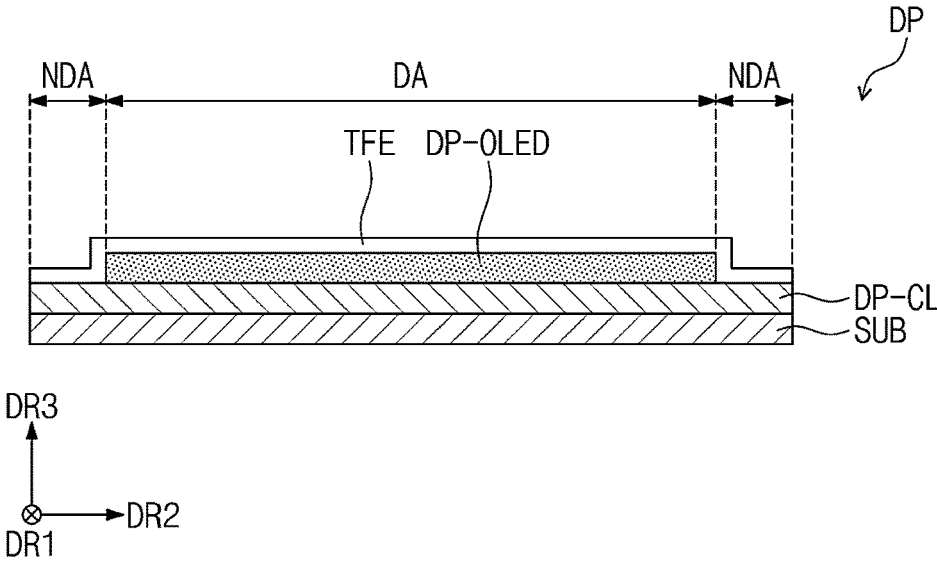
FIG. 3 is a cross-sectional view of a display panel illustrated in FIG. 2.

FIG. 3 is a cross-sectional view of the display panel illustrated in FIG. 2.

In FIG. 3, a section of the display panel DP viewed in the first direction DR1 is illustrated.

Referring to FIG. 3, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA at least partially surrounding the display area DA. The substrate SUB may contain a flexible material such as glass or a plastic, such as polyimide (PI). The display element layer DP-OLED may be disposed over the display area DA.

A plurality of pixels may be disposed in the circuit element layer DP-CL and the display element layer DP-OLED. Each of the pixels may include transistors disposed in the circuit element layer DP-CL and a light emitting element disposed in the display element layer DP-OLED and electrically connected to the transistors.

The thin-film encapsulation layer TFE may be disposed on the circuit element layer DP-CL and may cover the display element layer DP-OLED. The thin-film encapsulation layer TFE may protect the pixels from moisture, oxygen, and external foreign matter.

Figure 4:
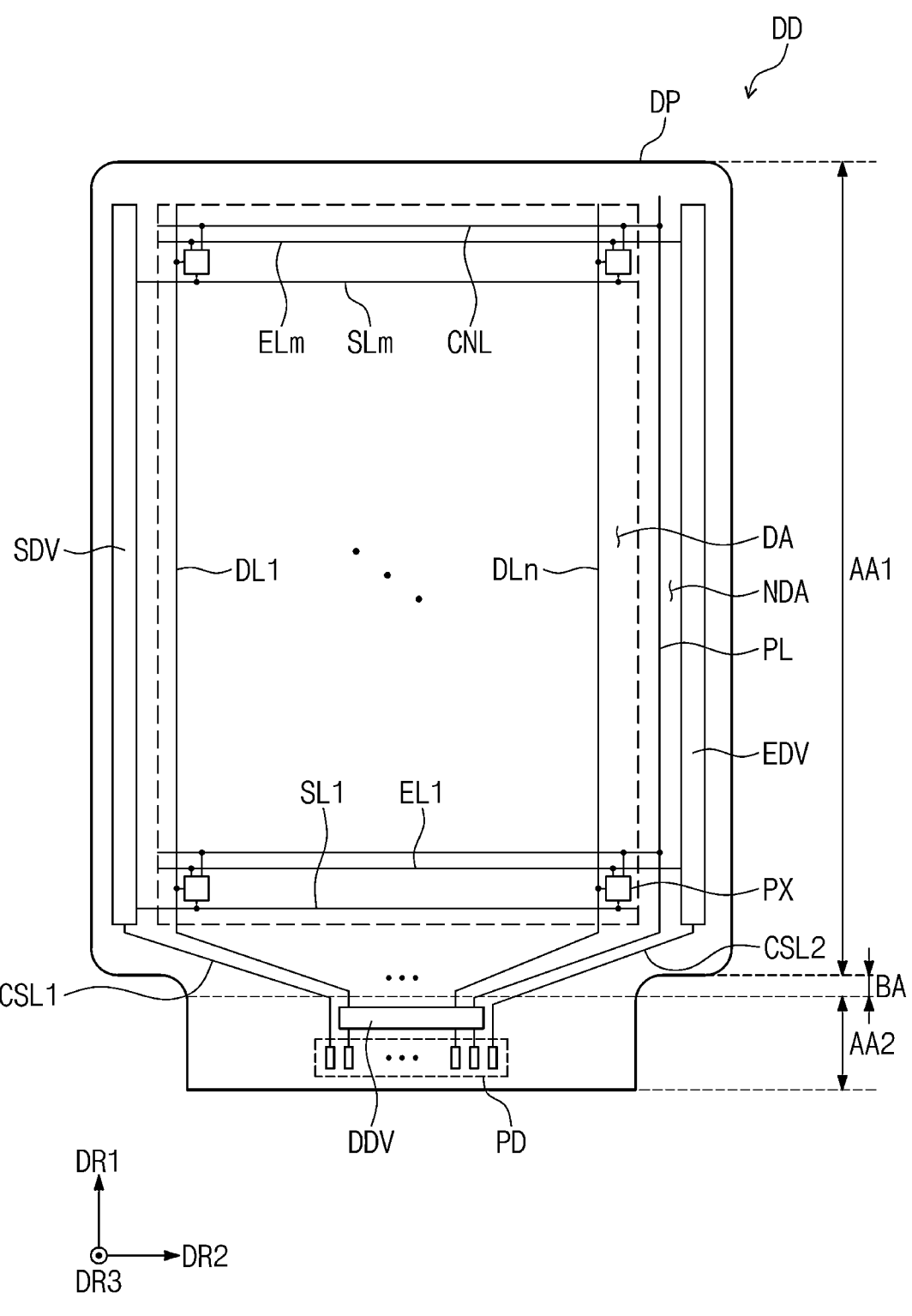
FIG. 4 is a plan view of the display panel illustrated in FIG. 2.

FIG. 4 is a plan view of the display panel illustrated in FIG. 2.

Referring to FIG. 4, the display device DD may include the display panel DP, a scan driver SDV, a data driver DDV, and a light emission driver EDV.

The planar area of the display panel DP, in a plan view, may include a first area AA1, a second area AA2, and a bending area BA between the first area AA1 and the second area AA2. The first area AA1 may extend longer in the first direction DR1 than in the second direction DR2. Based on the second direction DR2, the lengths of the second area AA2 and the bending area BA may be smaller than the length of the first area AA1.

The first area AA1 may include a display area DA that displays an image and a non-display area NDA that at least partially surrounds the display area DA and does not display an image. The bending area BA and the second area AA2 may be defined as the non-display area NDA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, a power line PL, a plurality of connecting lines CNL, and a plurality of pads PD. Here, "m" and "n" are positive integers.

The pixels PX may be disposed in the display area DA. The scan driver SDV and the light emission driver EDV may be disposed in the non-display areas NDA adjacent to opposite sides of the display panel DP that extend in the first direction DR1 and face away from each other in the second direction DR2. The data driver DDV may be disposed in the second area AA2.

The scan lines SL1 to SLm may extend in the second direction DR2 and may be electrically connected to the pixels PX and the scan driver SDV. The data lines DL1 to DLn may extend in the first direction DR1 and may be electrically connected to the pixels PX. The data lines DL1 to DLn may extend to the second area AA2 via the bending area BA and may be electrically connected to the data driver DDV. The light emission lines EL1 to ELm may extend in the second direction DR2 and may be electrically connected to the pixels PX and the light emission driver EDV.

The power line PL may extend in the first direction DR1 and may be disposed between the display area DA and the light emission driver EDV. The power line PL may extend toward the second area AA2 via the bending area BA.

The connecting lines CNL may extend in the second direction DR2. The connecting lines CNL may be arranged in the first direction DR1 and may be electrically connected to the power line PL and the pixels PX. A drive voltage for driving the pixels PX may be applied to the pixels PX through the power line PL and the connecting lines CNL electrically connected with each other.

The first control line CSL1 may be electrically connected to the scan driver SDV and may extend toward the second area AA2 via the bending area BA. The second control line CSL2 may be electrically connected to the light emission driver EDV and may extend toward the second area AA2 via the bending area BA. The data driver DDV may be disposed between the first control line CSL1 and the second control line CSL2.

The pads PD may be disposed in the second area AA2 and may be adjacent to one side of the second area AA2 that extends in the second direction DR2. The pads PD may be closer to the one side of the second area AA2 than the data driver DDV.

The data driver DDV, the power line PL, the first control line CSL1, and the second control line CSL2 may be electrically connected to the pads PD. The data lines DL1 to DLn may be electrically connected to the data driver DDV, and the data driver DDV may be electrically connected to the pads PD corresponding to the data lines DL1 to DLn.

The bending area BA may be bent such that the second area AA2 is located under the first area AA1. In this case, in a plan view, the second area AA2 and the data driver DDV might not be visible from the outside.

The display device DD may further include a timing controller for controlling operations of the scan driver SDV, the data driver DDV, and the light emission driver EDV and a voltage generator for generating the drive voltage. The timing controller and the voltage generator may be electrically connected to the pads PD through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals.

Figure 5:
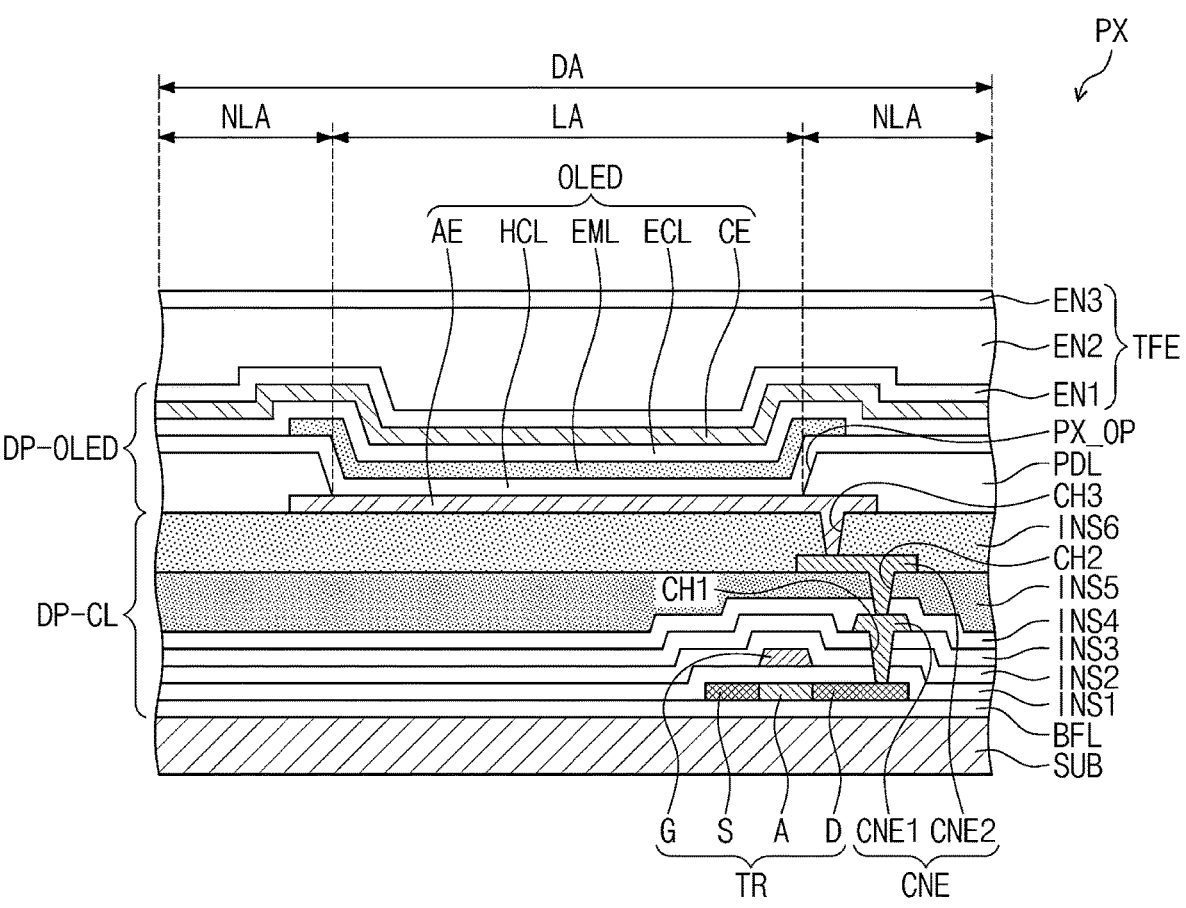
FIG. 5 is a cross-sectional view of one of pixels illustrated in FIG. 4.

FIG. 5 is a cross-sectional view of one of the pixels illustrated in FIG. 4.

Referring to FIG. 5, the pixel PX may include a transistor TR and a light emitting element OLED. The light emitting element OLED may include a first electrode AE (or, an anode), a second electrode CE (or, a cathode), a hole control layer HCL, an electron control layer ECL, and an emissive layer EML.

The transistor TR and the light emitting element OLED may be disposed over the substrate SUB. Although one transistor TR is illustrated, the pixel PX may substantially include a plurality of transistors and at least one capacitor for driving the light emitting element OLED.

The display area DA may include an emissive area LA corresponding to each of the pixels PX and a non-emissive area NLA at least partially surrounding the emissive area LA. The light emitting element OLED may be disposed in the emissive area LA.

A buffer layer BFL may be disposed on the substrate SUB. The buffer layer BFL may be an inorganic layer. A semiconductor pattern may be disposed on the buffer layer BFL. The semiconductor pattern may contain poly silicon, amorphous silicon, or metal oxide.

The semiconductor pattern may be doped with an N-type dopant or a P-type dopant. The semiconductor pattern may include a heavily doped area and a lightly doped area. The heavily doped area may have a higher conductivity than the lightly doped area and may substantially serve as a source electrode and a drain electrode of the transistor TR. The lightly doped area may substantially correspond to an active (or, channel) area of the transistor TR.

A source S, an active area A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connecting electrode CNE may include a first connecting electrode CNE1 and a second connecting electrode CNE2 for connecting the transistor TR and the light emitting element OLED. The first connecting electrode CNE1 may be disposed on the third insulating layer INS3 and may be electrically connected to the drain D through a first contact hole CH1 defined in the first to third insulating layers INS1 to INS3.

A fourth insulating layer INS4 may be disposed on the first connecting electrode CNE1. A fifth insulating layer INS5 may be disposed on the fourth insulating layer INS4. The second connecting electrode CNE2 may be disposed on the fifth insulating layer INS5. The second connecting electrode CNE2 may be electrically connected to the first connecting electrode CNE1 through a second contact hole CH2 defined in the fourth and fifth insulating layers INS4 and INS5.

A sixth insulating layer INS6 may be disposed on the second connecting electrode CNE2. The layers from the buffer layer BFL to the sixth insulating layer INS6 may be defined as the circuit element layer DP-CL. The first to sixth insulating layers INS1 to INS6 may be inorganic layers or organic layers.

The first electrode AE may be disposed on the sixth insulating layer INS6. The first electrode AE may be electrically connected to the second connecting electrode CNE2 through a third contact hole CH3 defined in the sixth insulating layer INS6. A pixel defining film PDL having an opening PX_OP defined therein for exposing a particular portion of the first electrode AE may be disposed on the first electrode AE and the sixth insulating layer INS6.

The hole control layer HCL may be disposed on the first electrode AE and the pixel defining film PDL. The hole control layer HCL may include a hole transporting layer and a hole injection layer.

The emissive layer EML may be disposed on the hole control layer HCL. The emissive layer EML may be disposed in an area corresponding to the opening PX_OP. The emissive layer EML may contain an organic material and/or an inorganic material. The emissive layer EML may generate any one of red light, green light, and blue light. Together, the emissive layers EML of the various pixels may generate each of red light, green light, and blue light by the employing of alternating patterns of colors among the various pixels.

The electron control layer ECL may be disposed on the emissive layer EML and the hole control layer HCL. The electron control layer ECL may include an electron transporting layer and an electron injection layer. The hole control layer HCL and the electron control layer ECL may be commonly disposed in the emissive area LA and the non-emissive area NLA.

The second electrode CE may be disposed on the electron control layer ECL. The second electrode CE may be commonly disposed for the pixels PX. The layer having the light emitting element OLED disposed therein may be defined as the display element layer DP-OLED.

The thin-film encapsulation layer TFE may be disposed on the second electrode CE and may cover the pixel PX. The thin-film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may each include an inorganic insulating layer and may protect the pixel PX from moisture/oxygen. The second encapsulation layer EN2 may include an organic insulating layer and may protect the pixel PX from foreign matter such as dust particles.

A first voltage may be applied to the first electrode AE through the transistor TR, and a second voltage may be applied to the second electrode CE. Holes and electrons injected into the emissive layer EML may be combined to form excitons, and the light emitting element OLED may emit light as the excitons relax to a ground state.

Figure 6:
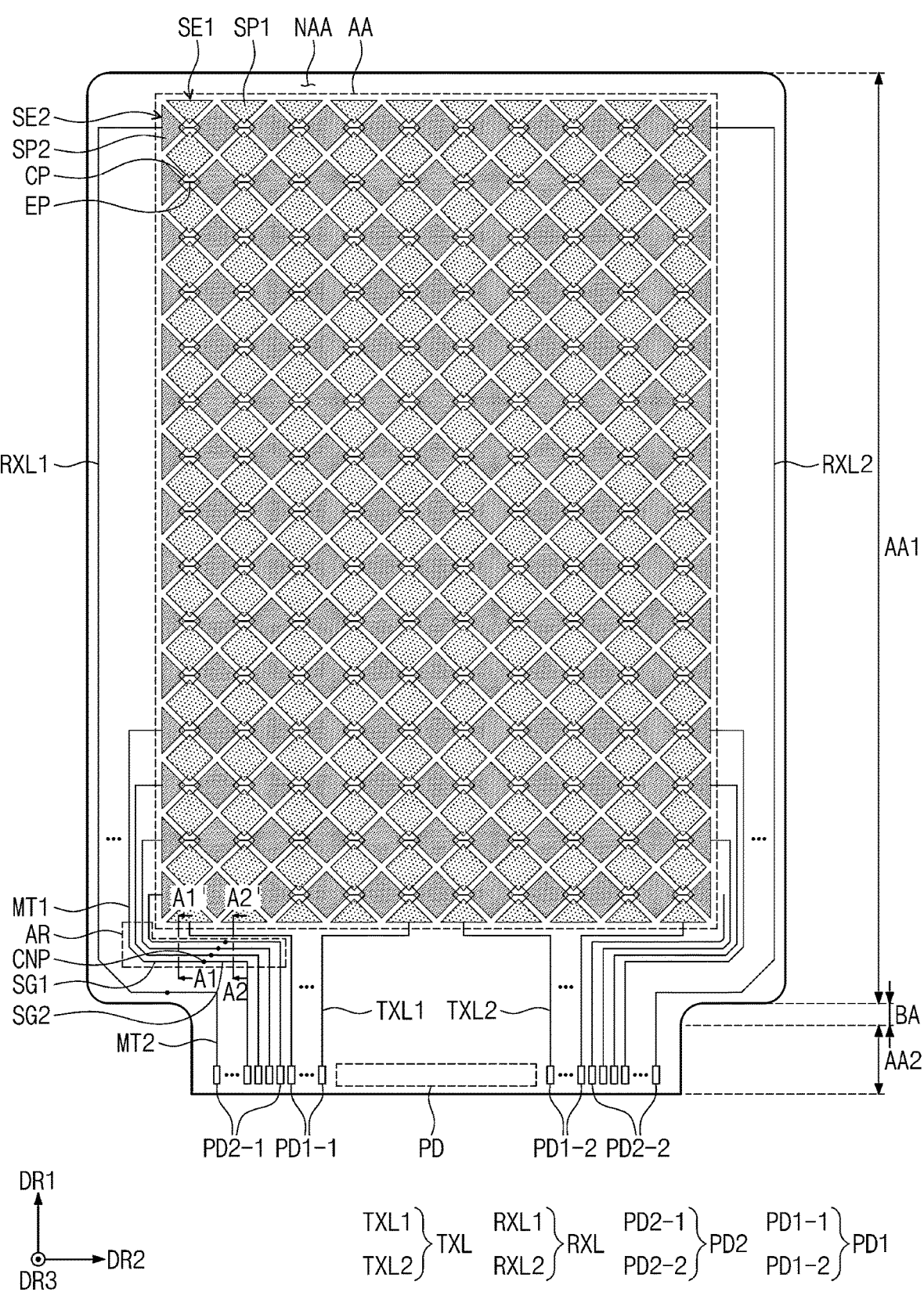
FIG. 6 is a plan view of an input sensing part illustrated in FIG. 2.

FIG. 6 is a plan view of the input sensing part illustrated in FIG. 2.

Referring to FIG. 6, the input sensing part ISP may include a plurality of sensing electrodes SE1 and SE2, a plurality of sensing lines TXL and RXL, and a plurality of first and second pads PD1 and PD2. The sensing electrodes SE1 and SE2, the sensing lines TXL and RXL, and the first and second pads PD1 and PD2 may be disposed on the thin-film encapsulation layer TFE of the display panel DP.

The planar area of the input sensing part ISP, may include a first area AA1, a second area AA2, and a bending area BA.

The first area AA1, the second area AA2, and the bending area BA of the input sensing part ISP may correspond to the first area AA1, the second area AA2, and the bending area BA of the display panel DP illustrated in FIG. 4.

The first area AA1 may include an active area AA and a non-active area NAA at least partially surrounding the active area AA. The active area AA may overlap and correspond to the display area DA, and the non-active area NAA may overlap and correspond to the non-display area NDA. The second area AA2 and the bending area BA may be defined as the non-active area NAA.

The sensing electrodes SE1 and SE2 may be disposed in the active area AA, and the first and second pads PD1 and PD2 may be disposed in the non-active area NAA. The first and second pads PD1 and PD2 may be disposed in the second area AA2. The first pads PD1 and the second pads PD2, in a plan view, may be adjacent to one side of the second area AA2 that extends in the second direction DR2.

The first pads PD1 may include a plurality of pads 1-1 PD1-1 and a plurality of pads 1-2 PD1-2. The second pads PD2 may include a plurality of pads 2-1 PD2-1 and a plurality of pads 2-2 PD2-2.

In a plan view, pads PD may be disposed between the pads 1-1 PD1-1 and the pads 1-2 PD1-2. The pads 1-1 PD1-1 may be disposed between the pads PD and the pads 2-1 PD2-1. The pads 1-2 PD1-2 may be disposed between the pads PD and the pads 2-2 PD2-2.

In a plan view, the pads 1-1 PD1-1 and the pads 2-1 PD2-1 may be disposed on the left side of the pads PD. In a plan view, the pads 1-2 PD1-2 and the pads 2-2 PD2-2 may be disposed on the right side of the pads PD.

The sensing lines TXL and RXL may be electrically connected to the sensing electrodes SE1 and SE2. The sensing lines TXL and RXL may extend to the non-active area NAA and may be electrically connected to the first and second pads PD1 and PD2. A sensing controller for controlling the input sensing part ISP may be electrically connected to the first and second pads PD1 and PD2 through a printed circuit board.

The sensing electrodes SE1 and SE2 may include the plurality of first sensing electrodes SE1 that extend in the first direction DR1 and that are arranged in the second direction DR2 and the plurality of second sensing electrodes SE2 that extend in the second direction DR2 and that are arranged in the first direction DR1. The second sensing electrodes SE2 may cross the first sensing electrodes SE1 and may be insulated from the first sensing electrodes SE1.

The sensing lines TXL and RXL may include the plurality of first sensing lines TXL electrically connected to the first sensing electrodes SE1 and the plurality of second sensing lines RXL electrically connected to the second sensing electrodes SE2. The first sensing lines TXL may be electrically connected to first ends of the first sensing electrodes SE1. The first ends of the first sensing electrodes SE1 may be adjacent to the second area AA2. The second sensing lines RXL may be electrically connected to first ends and second ends of the second sensing electrodes SE2. The first ends and the second ends of the second sensing electrodes SE2 may face away from each other in the second direction DR2.

The first sensing lines TXL may extend to the non-active area NAA and may be electrically connected to the first pads PD1. The first sensing lines TXL may extend to the second area AA2 via the bending area BA.

The second sensing lines RXL may extend to the non-active area NAA and may be electrically connected to the second pads PD2. The second sensing lines RXL may extend in the first direction DR1 and may extend to the non-active areas NAA adjacent to opposite sides of the first area AA1 that face away from each other in the second direction DR2. The second sensing lines RXL may extend to the second area AA2 via the bending area BA.

The first sensing lines TXL may include a plurality of first transmitting lines TX1 and a plurality of second transmitting lines TXL2. The first transmitting lines TXL1 may be electrically connected to some of the first sensing electrodes SE1 and the pads 1-1 PD1-1. For example, the first transmitting lines TXL1 may be electrically connected to the first ends of the first sensing electrodes SE1 disposed on the left side with respect to the center of the active area AA.

The second transmitting lines TXL2 may be electrically connected to the other first sensing electrodes SE1 and the pads 1-2 PD1-2. For example, the second transmitting lines TXL2 may be electrically connected to the first ends of the first sensing electrodes SE1 disposed on the right side with respect to the center of the active area AA.

The second sensing lines RXL may include a plurality of first receiving lines RX1 and a plurality of second receiving lines RXL2. The first receiving lines RXL1 may be electrically connected to the first ends of the second sensing electrodes SE2 and the pads 2-1 PD2-1. For example, the first receiving lines RXL1 may be disposed in the left non-active area NAA of the first area AA1, and the first ends of the second sensing electrodes SE2 may be adjacent to the left non-active area NAA.

The second receiving lines RXL2 may be electrically connected to the second ends of the second sensing electrodes SE2 and the pads 2-2 PD2-2. For example, the second receiving lines RXL2 may be disposed in the right non-active area NAA of the first area AA1, and the second ends of the second sensing electrodes SE2 may be adjacent to the right non-active area NAA.

Drive signals for driving the first and second sensing electrodes SE1 and SE2 may be applied to the first and second sensing electrodes SE1 and SE2 through the first sensing lines TXL. Sensing signals sensed by the first and second sensing electrodes SE1 and SE2 may be output through the second sensing lines RXL.

Each of the first sensing electrodes SE1 may include a plurality of first sensing parts SP1 arranged in the first direction DR1 and a plurality of connecting patterns CP connecting the first sensing parts SP1. Each of the connecting patterns CP may extend toward two first sensing parts SP1 adjacent to each other in the first direction DR1 via two second sensing parts SP2 adjacent to each other in the second direction DR2.

The connecting pattern CP may be disposed between the two first sensing parts SP1 adjacent to each other in the first direction DR1 and may connect the two first sensing parts SP1. For example, an insulating layer may be disposed between the connecting patterns CP and the first sensing parts SP1, and the connecting patterns CP may be electrically connected to the first sensing parts SP1 through contact holes defined in the insulating layer.

Each of the second sensing electrodes SE2 may include a plurality of second sensing parts SP2 arranged in the second direction DR2 and a plurality of extending patterns EP extending from the second sensing parts SP2. In the second sensing electrode SE2, the extending patterns EP may be integrally formed with the second sensing parts SP2. Each of the extending patterns EP may be disposed between two second sensing parts SP2 adjacent to each other in the second direction DR2 and may extend from the two second sensing parts SP2.

The first sensing parts SP1 and the second sensing parts SP2 may be spaced apart from each other without overlapping each other and may be alternately disposed. Capacitances may be formed by the first sensing parts SP1 and the second sensing parts SP2. In a plan view, the extending patterns EP may be disposed between the connecting patterns CP and might not overlap the connecting patterns CP.

The first and second sensing parts SP1 and SP2 and the extending patterns EP may be disposed in the same layer. The connecting patterns CP may be disposed in a different layer from the first and second sensing parts SP1 and SP2 and the extending patterns EP.

The first receiving lines RXL1 of the second sensing lines RXL may include a plurality of first multi-layer lines MT1, a plurality of second multi-layer lines MT2, a plurality of first single-layer lines SG1, and a plurality of second single-layer lines SG2. Detailed configurations of the first and second multi-layer lines MT1 and MT2 and the first and second single-layer lines SG1 and SG2 will be described below with reference to FIGS. 6 and 9.

Figure 7:
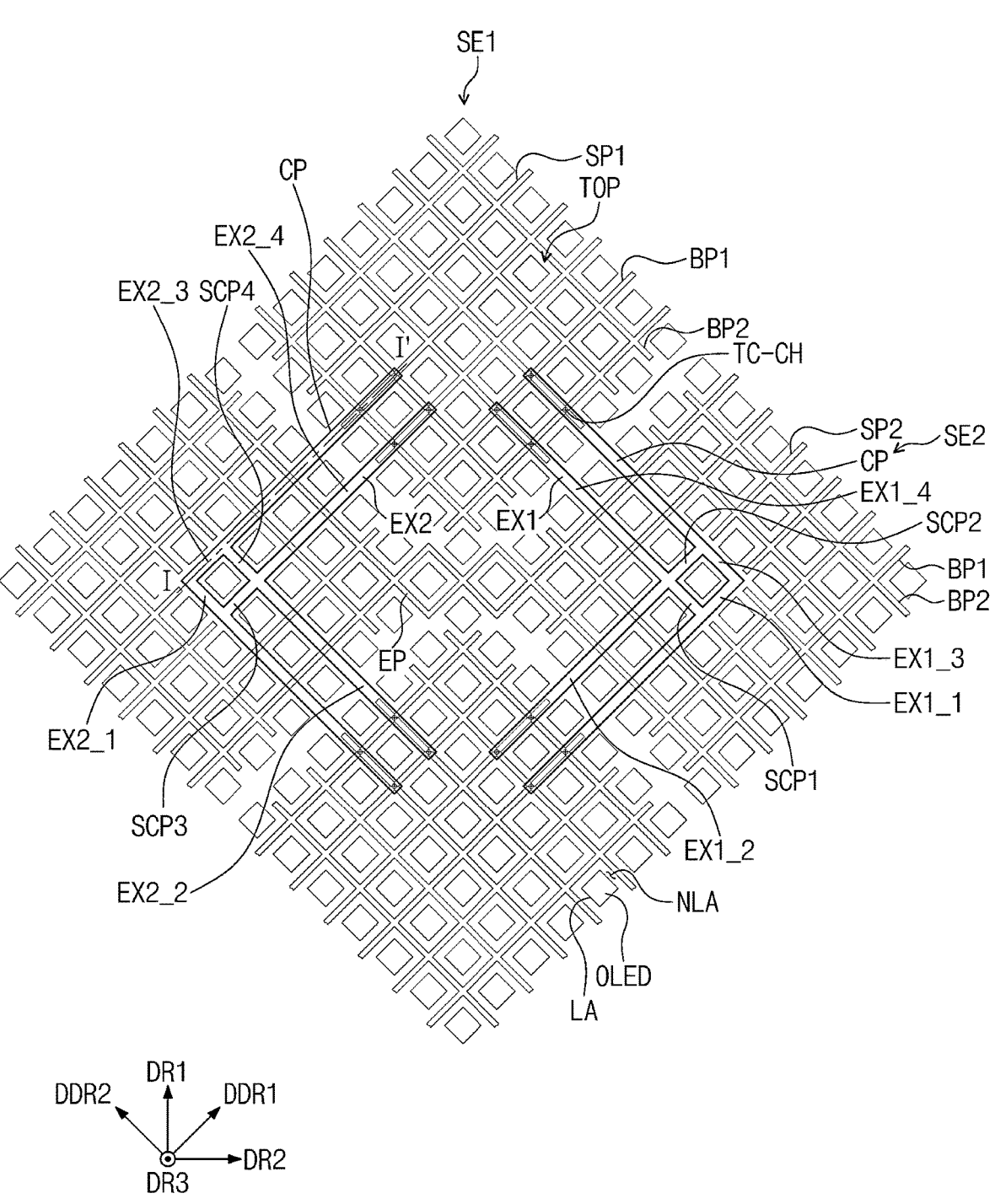
FIG. 7 is an enlarged view of two adjacent first sensing parts and two adjacent second sensing parts illustrated in FIG. 6.

FIG. 7 is an enlarged view of two adjacent first sensing parts and two adjacent second sensing parts illustrated in FIG. 6.

Referring to FIG. 7, the first sensing parts SP1 and the second sensing parts SP2 may have a mesh shape. To have a mesh shape, each of the first and second sensing parts SP1 and SP2 may include a plurality of first branches BP1 extending in a first diagonal direction DDR1 and a plurality of second branches BP2 extending in a second diagonal direction DDR2.

The first diagonal direction DDR1 may be defined as a direction crossing the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2. For example, the first direction DR1 and the second direction DR2 may cross each other at a right angle, and the first diagonal direction DDR1 and the second diagonal direction DDR2 may cross each other at a right angle.

The first branches BP1 and the second branches BP2 of each of the first and second sensing parts SP1 and SP2 may cross each other and may be integrally formed with each other so that they are together a single uninterrupted structure. Touch openings TOP having a rhombic shape may be defined by the first branches BP1 and the second branches BP2.

In a plan view, emissive areas LA may be disposed in the touch openings TOP. Light emitting elements OLED may be disposed in the emissive areas LA. Each of the emissive areas LA may correspond to the emissive area LA illustrated in FIG. 5. The first and second sensing parts SP1 and SP2 may be disposed in a non-emissive area NLA. As the first and second sensing parts SP1 and SP2 are disposed in the non-emissive area NLA, light generated from the emissive areas LA may be normally output without being affected by the first and second sensing parts SP1 and SP2.

A connecting pattern CP may extend so as not to overlap an extending pattern EP and may connect the first sensing parts SP1. The connecting pattern CP may be electrically connected to the first sensing parts SP1 through a plurality of contact holes TC-CH. The structure of the contact holes TC-CH will be described below with reference to FIG. 8. The connecting pattern CP may extend toward the first sensing parts SP1 via areas overlapping the second sensing parts SP2.

The extending pattern EP may be disposed between the first sensing parts SP1 and may extend from the second sensing parts SP2. The second sensing parts SP2 and the extending pattern EP may be integrally formed with each other. The extending pattern EP may have a mesh shape. The extending pattern EP, the first sensing parts SP1, and the second sensing parts P2 may be disposed in the same layer and may be formed by being simultaneously subjected to patterning with the same material.

The connecting pattern CP may include a first extension EX1 and a second extension EX2 having a shape symmetrical to the first extension EX1. The extending pattern EP may be disposed between the first extension EX1 and the second extension EX2.

The first extension EX1 may extend via an area overlapping one of the second sensing parts SP2 and may be electrically connected to the first sensing parts SP1. The second extension EX2 may extend via an area overlapping the other one of the second sensing parts SP2 and may be electrically connected to the first sensing parts SP1.

Hereinafter, the first sensing parts SP1 are defined as the upper first sensing part SP1 and the lower first sensing part SP1 depending on the relative positions thereof. Furthermore, the second sensing parts SP2 are defined as the left second sensing part SP2 and the right second sensing part SP2 depending on the relative positions thereof.

Particular portions of the first and second extensions EX1 and EX2 adjacent to one side of the first and second extensions EX1 and EX2 may be electrically connected to the lower first sensing part SP1 through the plurality of contact holes TC-CH. Particular portions of the first and second extensions EX1 and EX2 adjacent to the opposite side of the first and second extensions EX1 and EX2 may be electrically connected to the upper first sensing part SP1 through the plurality of contact holes TC-CH.

The first extension EX1 may include a first sub-extension EX1_1 and a second sub-extension EX1_2 that extend in the first diagonal direction DDR1, a third sub-extension EX1_3 and a fourth sub-extension EX1_4 that extend in the second diagonal direction DDR2, a first sub-conductive pattern SCP1 extending in the second diagonal direction DDR2, and a second sub-conductive pattern SCP2 extending in the first diagonal direction DDR1.

Particular portions of the first and second sub-extensions EX1_1 and EX1_2 adjacent to one side of the first and second sub-extensions EX1_1 and EX1_2 may be electrically connected to the lower first sensing part SP1 through the plurality of contact holes TC-CH. Particular portions of the third and fourth sub-extensions EX1_3 and EX1_4 adjacent to one side of the third and fourth sub-extensions EX1_3 and EX1_4 may be electrically connected to the upper first sensing part SP1 through the plurality of contact holes TC-CH.

An opposite side of the first sub-extension EX1_1 may extend from an opposite side of the third sub-extension EX1_3, and an opposite side of the second sub-extension EX1_2 may extend from an opposite side of the fourth sub-extension EX1_4. The first sub-conductive pattern SCP1 may extend from the opposite side of the fourth sub-extension EX1_4 in the second diagonal direction DDR2 and may extend to the first sub-extension EX1-1. The second sub-conductive pattern SCP2 may extend from the opposite side of the second sub-extension EX1_2 in the first diagonal direction DDR1 and may extend to the third sub-extension EX1_3.

The first sub-extension EX1_1, the second sub-extension EX1_2, the third sub-extension EX1_3, the fourth sub-extension EX1_4, the first sub-conductive pattern SCP1, and the second sub-conductive pattern SCP2 may be integrally formed.

The first and second sub-extensions EX1_1 and EX1_2 may extend to cross a particular number of second branches BP2 adjacent to the lower first sensing part SP1 among the second branches BP2 of the right second sensing part SP2. The first branches BP1 of the right second sensing part SP2 might not be disposed in partial areas that overlap the first and second sub-extensions EX1_1 and EX1_2 and the second sub-conductive pattern SCP2.

The third and fourth sub-extensions EX1_3 and EX1_4 may extend to cross a particular number of first branches BP1 adjacent to the upper first sensing part SP1 among the first branches BP1 of the right second sensing part SP2. The second branches BP2 of the right second sensing part SP2 might not be disposed in partial areas that overlap the third and fourth sub-extensions EX1_3 and EX1_4 and the first sub-conductive pattern SCP1.

The second extension EX2 may include a fifth sub-extension EX2_1 and a sixth sub-extension EX2_2 that extend in the second diagonal direction DDR2, a seventh sub-extension EX2_3 and an eighth sub-extension EX2_4 that extend in the first diagonal direction DDR1, a third sub-conductive pattern SCP3 extending in the first diagonal direction DDR1, and a fourth sub-conductive pattern SCP4 extending in the second diagonal direction DDR2.

The left second sensing part SP2 may have a structure that is symmetrical to the right second sensing part SP2, and the second extension EX2 may have a structure that is symmetrical to the first extension EX1. Accordingly, the fifth to eighth sub-extensions EX2_1 to EX2_4 and the third and fourth sub-conductive patterns SCP3 and SCP4 have a structure that can be understood in light of the preceding.

Figure 8:
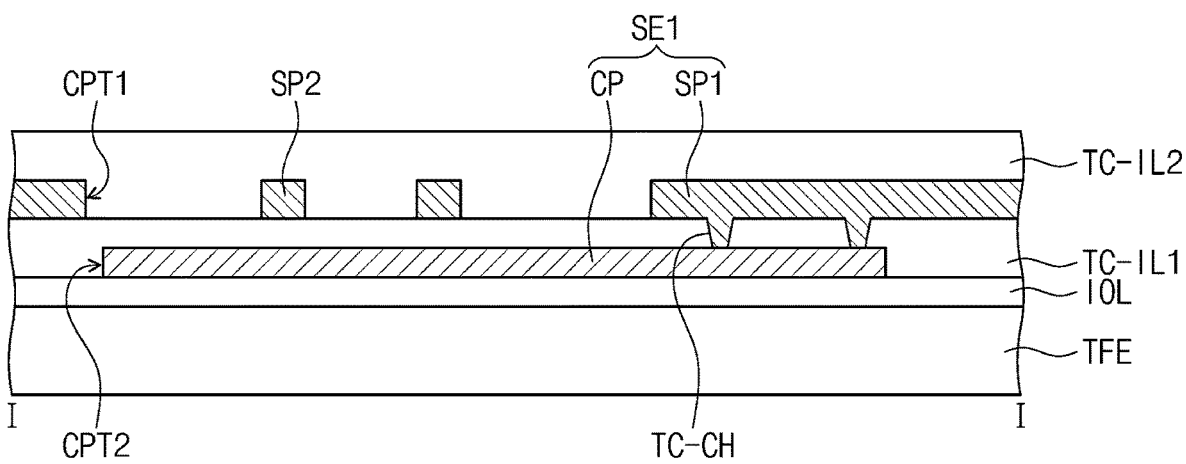
FIG. 8 is a cross-sectional view taken along line I-I' illustrated in FIG. 7.

FIG. 8 is a cross-sectional view taken along line I-I' illustrated in FIG. 7.

Referring to FIG. 8, an insulating layer IOL may be disposed on the thin-film encapsulation layer TFE. The insulating layer IOL may include an inorganic insulating layer. At least one insulating layer IOL may be disposed on the thin-film encapsulation layer TFE. For example, two inorganic insulating layers IOL may be sequentially stacked on the thin-film encapsulation layer TFE.

The connecting pattern CP may be disposed on the insulating layer IOL. A first insulating layer TC-IL1 may be disposed on the connecting pattern CP and the insulating layer IOL. The first insulating layer TC-IL1 may be disposed on the insulating layer IOL and may cover the connecting pattern CP. The first insulating layer TC-IL1 may include an inorganic insulating layer or an organic insulating layer.

The first sensing parts SP1 and the second sensing parts SP2 may be disposed on the first insulating layer TC-IL1. The extending pattern EP integrally formed with the second sensing parts SP2 may also be disposed on the first insulating layer TC-IL1. The connecting pattern CP may be electrically connected to the first sensing parts SP1 through the plurality of contact holes TC-CH defined in the first insulating layer TC-IL1.

The sensing parts SP1 and SP2 may be defined as a first conductive pattern CPT1. The first and second sensing parts SP1 and SP2 may be formed by the first conductive pattern CPT1. The connecting pattern CP connecting the first sensing parts SP1 among the first and second sensing parts SP1 and SP2 may be defined as a second conductive pattern CPT2.

A second insulating layer TC-IL2 may be disposed on the first and second sensing parts SP1 and SP2 and the first insulating layer TC-IL1. The second insulating layer TC-IL2 may be disposed on the first insulating layer TC-IL1 and may cover the first and second sensing parts SP1 and SP2. The second insulating layer TC-IL2 may include an organic insulating layer.

Figure 9:
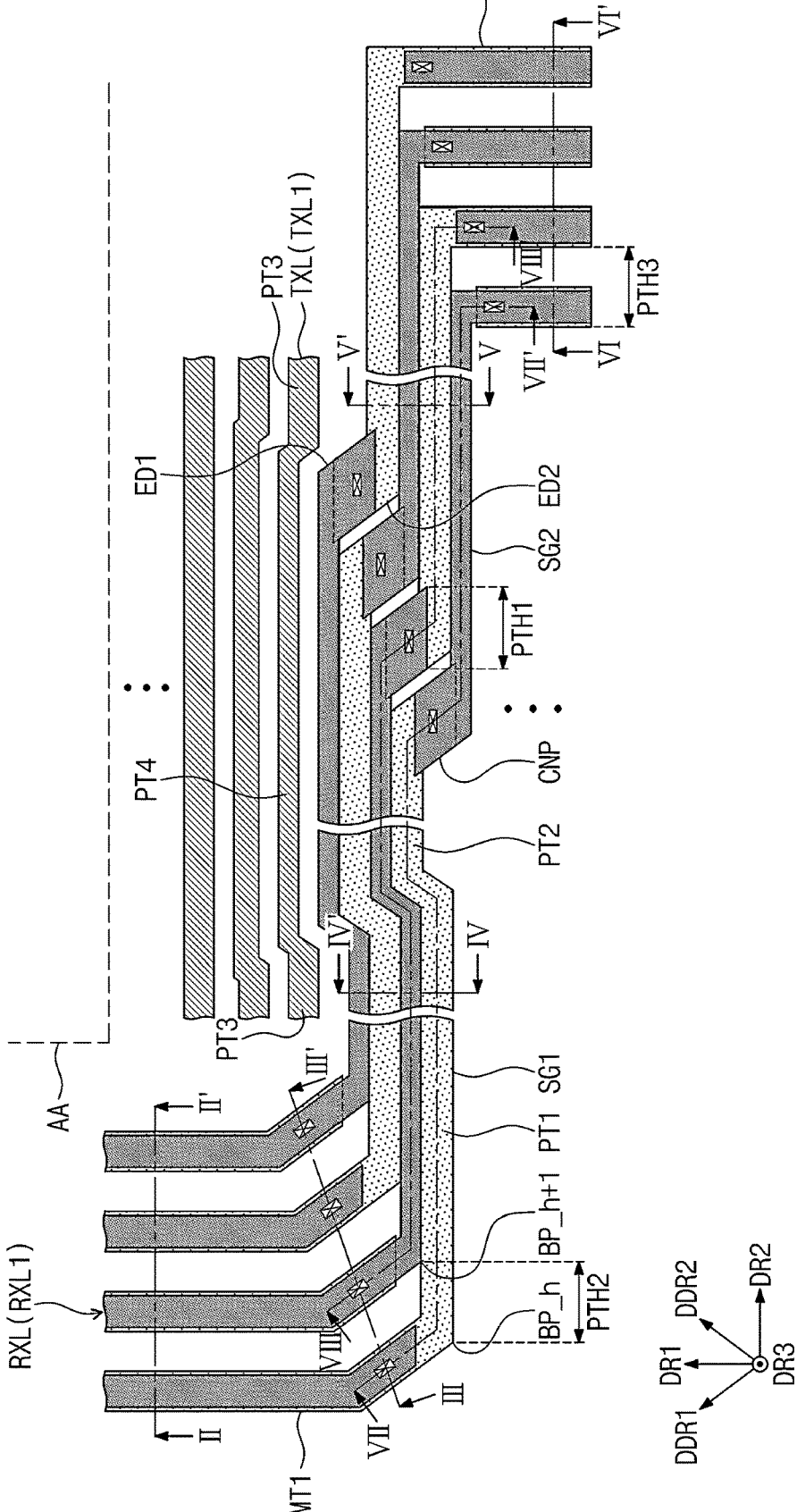
FIG. 9 is an enlarged view of an area AR illustrated in FIG. 6.

FIG. 9 is an enlarged view of an area AR illustrated in FIG. 6.

In FIG. 9, some first sensing lines TXL adjacent to the first receiving lines RXL1 disposed in the area AR are additionally illustrated. The first sensing lines TXL illustrated in FIG. 9 may be the first transmitting lines TXL1. Although four first receiving lines RXL1 and three first transmitting lines TXL1 are illustrated, a larger number of lines may be included within the input sensing part ISP.

Referring to FIGS. 6 and 9, the first receiving lines RXL1 may include the plurality of first multi-layer lines MT1, the plurality of second multi-layer lines MT2, the plurality of first single-layer lines SG1, and the plurality of second single-layer lines SG2.

The second receiving lines RXL2 may be symmetrical with respect to the first receiving lines RXL1 and may have substantially the same configuration as the first receiving lines RXL1. In addition, the second transmitting lines TXL2 may be symmetrical with respect to the first transmitting lines TXL1 and may have substantially the same configuration as the first transmitting lines TXL1.

The first multi-layer lines MT1 may be electrically connected to the first ends of the second sensing electrodes SE2. The first multi-layer lines MT1 may extend in the first direction DR1 and may be arranged in the second direction DR2. As illustrated in FIG. 6, the active area AA may have a rectangular shape. The first multi-layer lines MT1 may extend in the first direction DR1 and thereafter may extend in the first diagonal direction DDR1 in the corner of the active area AA adjacent to the bending area BA.

The first diagonal direction DDR1 may be defined as a direction crossing the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2.

The second multi-layer lines MT2 may be spaced apart from the first multi-layer lined MT1 in the second direction DR2. The second multi-layer lines MT2 may extend in the first direction DR1 and may be arranged in the second direction DR2. The second multi-layer lines MT2 may extend to the second area AA2 via the bending area BA. The second multi-layer lines MT2 extending to the second area AA2 may be electrically connected to the pads 2-1 PD2-1 disposed in the second area AA2.

The first multi-layer lines MT1 may have a structure in which at least two lines are stacked. The second multi-layer lines MT2 may also have a structure in which at least two lines are stacked. Cross-sectional structures of the first and second multi-layer lines MT1 and MT2 will be described below in detail with reference to some of the cross-sectional views of FIGS. 10 to 16.

The first single-layer lines SG1 may extend from the first multi-layer lines MT1. For example, the first single-layer lines SG1 may be bent from the first multi-layer lines MT1. The first single-layer lines SG1 may extend in the second direction DR2 and may be arranged in the first direction DR1.

The second single-layer lines SG2 may extend from the second multi-layer lines MT2. For example, the second single-layer lines SG2 may be bent from the second multi-layer lines MT2. The second single-layer lines SG2 may extend in the second direction DR2 and may be arranged in the first direction DR1.

The first single-layer lines SG1 may be alternately disposed in different layers in the first direction DR1. The second single-layer lines SG2 may be alternately disposed in different layers in the first direction DR1. The first single-layer line SG1 and the second single-layer line SG2 electrically connected with each other may be disposed in different layers. This structure will be described below in detail with reference to some of the cross-sectional views of FIGS. 10 to 16.

The first single-layer lines SG1 may be electrically connected to the second single-layer lines SG2, respectively. For example, first ends ED1 of the first single-layer lines SG1 may be electrically connected to second ends ED2 of the second single-layer lines SG2, respectively. The first ends ED1 may be electrically connected to the second ends ED2 through connecting parts CNP, respectively. The connecting parts CNP may extend from the first ends ED1 and the second ends ED2. Configurations of the connecting parts CNP will be described below in detail with reference to FIGS. 17 and 18.

The first single-layer lines SG1 may include first parts PT1 extending from the first multi-layer lines MT1 and second parts PT2 extending from the first parts PT1. The first parts PT1 may be bent from the first multi-layer lines MT1 and may extend in the second direction DR2. The second parts PT2 may be bent from the first parts PT1 toward the active area AA in the second diagonal direction DDR2 and may extend in the second direction DR2. The second parts PT2 may be electrically connected to the second single-layer lines SG2.

As used herein, a line width may be defined as a numerical value measured in a direction crossing the extension direction of a line. When a line extends in the first direction DR1, the line width of the line extending in the first direction DR1 may be defined as a numerical value measured in the second direction DR2. When a line extends in the second direction DR2, the line width of the line extending in the second direction DR2 may be defined as a numerical value measured in the first direction DR1. Furthermore, in this specification, a thickness may be defined as a numerical value measured in the third direction DR3.

The connecting parts CNP may extend substantially from the first ends ED1 of the first single-layer lines SG1 and the second ends ED2 of the second single-layer lines SG2. In each of the first single-layer lines SG1, the second part PT2 may be bent from the first part PT1 and may be disposed closer to the active area AA than the first part PT1. Accordingly, the first ends ED1 and the second ends ED2 may be spaced apart from each other in the first direction DR1. In this case, the connecting parts CNP extending from the first ends ED1 and the second ends ED2 may be formed to have a line width greater than the line widths of the first and second single-layer lines SG1 and SG2.

The gap between one side of the $h^{th}$ connecting part CNP and one side of the $(h+1)^{th}$ connecting part CNP in the second direction DR2 may be defined as a first pitch PTH1. One side of each connecting part CNP may be defined as a right end of the connecting part CNP based on the second direction DR2.

In the second direction DR2, the gap between one side BP_h of a bent portion between the $h^{th}$ first multi-layer line MT1 and the $h^{th}$ first single-layer line SG1 and one side BP_h+1 of a bent portion between the $(h+1)^{th}$ first multi-layer line MT1 and the $(h+1)^{th}$ first single-layer line SG1 may be defined as a second pitch PTH2. The sides BP_h and BP_h+1 may be defined on bent portions not facing the active area AA.

The gap between one side of the $h^{th}$ second multi-layer line MT2 and one side of the $(h+1)^{th}$ second multi-layer line MT2 in the second direction DR2 may be defined as a third pitch PTH3. One side of each of the second multi-layer lines MT2 may be defined as a right side of the corresponding connecting part CNP based on the second direction DR2. The first pitch PTH1, the second pitch PTH2, and the third pitch PTH3 may be substantially the same as one another.

A particular number of first sensing lines TXL adjacent to the first and second single-layer lines SG1 and SG2 among the first sensing lines TXL may each include a third part PT3 and a fourth part PT4. Hereinafter, the structure of the first sensing line TXL closest to the first and second single-layer lines SG1 and SG2 will be described.

The first sensing line TXL may include the third part PT3 adjacent to the first part PT1 and the fourth part PT4 adjacent to the second part PT2. The first sensing line TXL adjacent to the second single-layer lines SG2 may also be defined as the third part PT3. The third part PT3 may extend in the second direction DR2. The fourth part PT4 may be bent toward the active area AA in the second diagonal direction DDR2 and thereafter may extend in the second direction DR2. In the first direction DR1, the fourth part PT4 may have a smaller line width than the third part PT3.

As the second parts PT2 are bent from the first parts PT1 toward the active area AA, the first sensing line TXL may be formed in a bent structure to secure an area for the second parts PT2. Although not described in detail, the first sensing line TXL that is the second closest to the first and second single-layer lines SG1 and SG2 may have a structure similar to that of the first sensing line TXL closest to the first and second single-layer lines SG1 and SG2.

Figure 10:
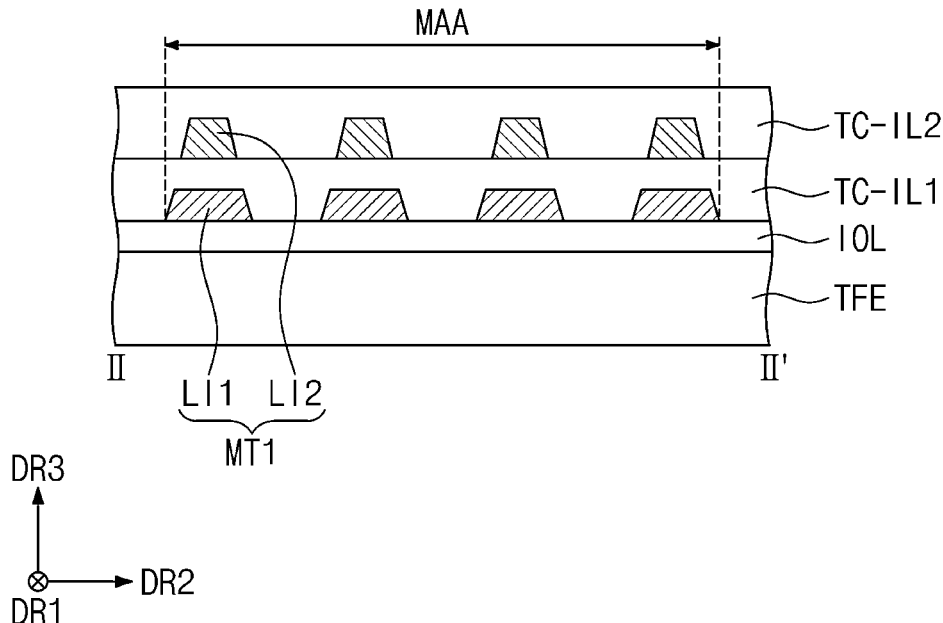
FIG. 10 is a cross-sectional view taken along line II-II' illustrated in FIG. 9.
Figure 11:
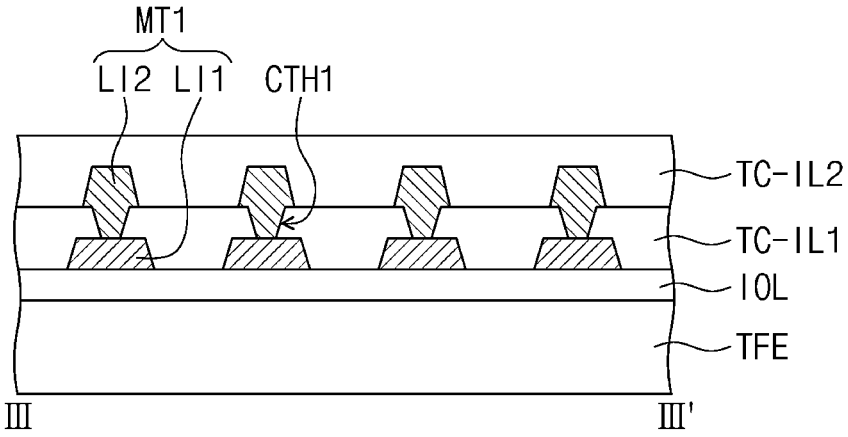
FIG. 11 is a cross-sectional view taken along line III-III' illustrated in FIG. 9.

FIG. 10 is a cross-sectional view taken along line II-II' illustrated in FIG. 9. FIG. 11 is a cross-sectional view taken along line III-III' illustrated in FIG. 9.

Referring to FIG. 10, each of the first multi-layer lines MT1 may include a first line LI1 and a second line LI2 disposed over the first line LI1. The first lines LI1 may be disposed on the insulating layer IOL and may be disposed in the same layer as the above-described connecting patterns CP. The first insulating layer TC-IL1 may be disposed on the insulating layer IOL and may cover the first lines LI1.

The second lines LI2 may be disposed on the first insulating layer TC-IL1. The second lines LI2 may be disposed in the same layer as the above-described first and second sensing electrodes SE1 and SE2. In a plan view, the second lines LI2 may overlap the first lines LI1, respectively. The second insulating layer TC-IL2 may be disposed on the first insulating layer TC-IL1 and may cover the second lines LI2.

In a manufacturing process of the lines, the first lines LI1 might not be formed to be same as the second lines LI2. The first lines LI1 may have a different line width and a different thickness from the second lines LI2. For example, in the second direction DR2, the line widths of the first lines LI1 may be greater than the line widths of the second lines LI2. In the third direction DR3, the thicknesses of the second lines LI2 may be greater than the thicknesses of the first lines LI1.

The first multi-layer lines MT1 may be spaced apart from each other in the second direction DR2. The area in which the first multi-layer lines MT1 are disposed may be defined as a first wiring area MAA.

Referring to FIG. 11, the second lines LI2 may overlap the first lines LI1, respectively, and may be electrically connected to the first lines LI1, respectively. The second lines LI2 may be electrically connected to the first lines LI1 through first contact holes CTH1 defined in the first insulating layer TC-IL1.

Figure 12:
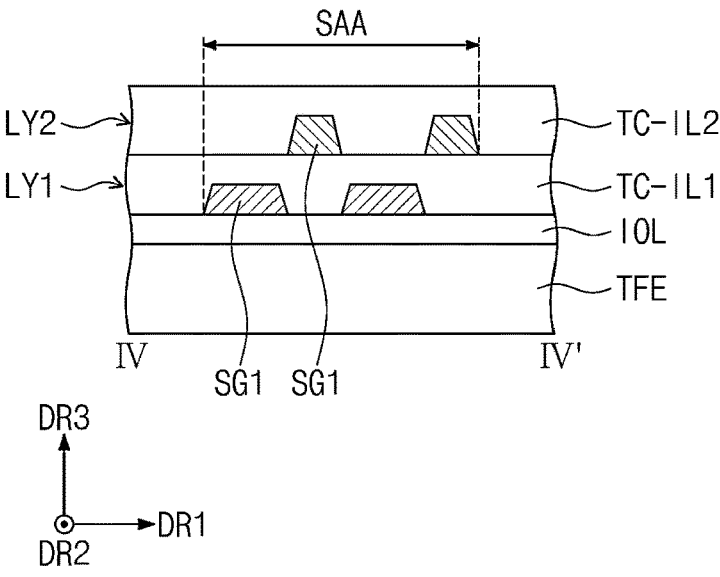
FIG. 12 is a cross-sectional view taken along line IV-IV' illustrated in FIG. 9.
Figure 13:
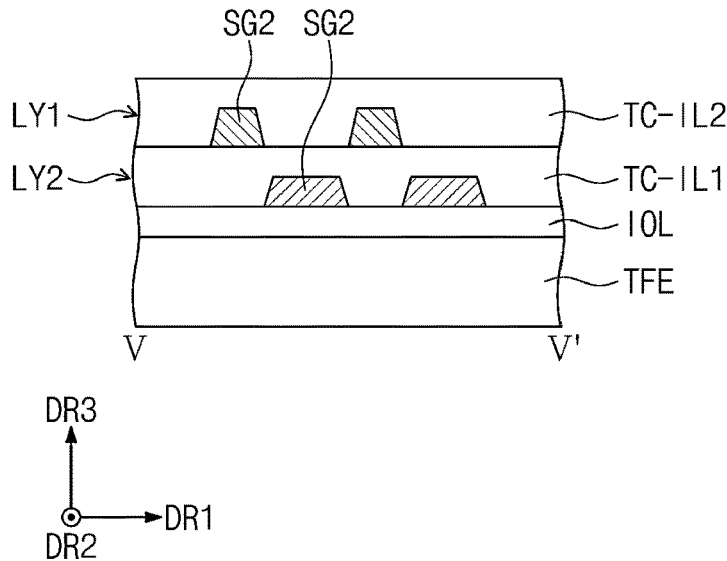
FIG. 13 is a cross-sectional view taken along line V-V' illustrated in FIG. 9.

FIG. 12 is a cross-sectional view taken along line IV-IV' illustrated in FIG. 9. FIG. 13 is a cross-sectional view taken along line V-V' illustrated in FIG. 9.

Referring to FIG. 12, the first single-layer lines SG1 may be disposed on the insulating layer IOL and the first insulating layer TC-IL1. The first single-layer lines SG1 may be alternately disposed in different layers in the first direction DR1. The first single-layer lines SG1 disposed on the insulating layer IOL may have substantially the same structure as the first lines LI1. The first single-layer lines SG1 disposed on the first insulating layer TC-IL1 may have substantially the same structure as the second lines LI2.

The area in which the first single-layer lines SG1 are disposed may be defined as a second wiring area SAA. The second wiring area SAA may be smaller than the first wiring area MAA illustrated in FIG. 10. When lines are alternately disposed in a single layer, a non-active area in which the lines are disposed may be reduced, as compared with when the lines are disposed in multiple layers.

Referring to FIGS. 6, 9, and 12, in the non-active area NAA between one side of the active area AA facing the bending area BA and the bending area BA, the first single-layer lines SG1 may be alternately disposed in a single layer, and thus the non-active area NAA may be reduced.

Referring to FIG. 13, the second single-layer lines SG2 may be disposed on the insulating layer IOL and the first insulating layer TC-IL1. The second single-layer lines SG2 may be alternately disposed in different layers in the first direction DR1.

The second single-layer lines SG2 disposed on the insulating layer IOL may have substantially the same structure as the first lines LI1. The second single-layer lines SG2 disposed on the first insulating layer TC-IL1 may have substantially the same structure as the second lines LI2. As the second single-layer lines SG2 are also alternately disposed in a single layer, the non-active area NAA may be reduced as in the case of the first single-layer lines SG1.

Referring to FIGS. 12 and 13, the order in which the first single-layer lines SG1 are disposed may be opposite to the order in which the second single-layer lines SG2 are disposed. For example, the layer on the insulating layer IOL may be defined as a first layer LY1, and the layer on the first insulating layer TC-IL1 may be defined as a second layer LY2. When the first single-layer lines SG1 are alternately disposed in the first layer LY1 and the second layer LY2 in the first direction DR1, the second single-layer lines SG2 may be alternately disposed in the second layer LY2 and the first layer LY1 in the first direction DR1.

The line widths of the first and second single-layer lines SG1 and SG2 disposed in the first layer LY1 may differ from the line widths of the first and second single-layer lines SG1 and SG2 disposed in the second layer LY2. For example, the line widths of the first and second single-layer lines SG1 and SG2 disposed in the first layer LY1 may be greater than the line widths of the first and second single-layer lines SG1 and SG2 disposed in the second layer LY2.

The thicknesses of the first and second single-layer lines SG1 and SG2 disposed in the second layer LY2 may differ from the thicknesses of the first and second single-layer lines SG1 and SG2 disposed in the first layer LY1. For example, the thicknesses of the first and second single-layer lines SG1 and SG2 disposed in the second layer LY2 may be greater than the thicknesses of the first and second single-layer lines SG1 and SG2 disposed in the first layer LY1.

The first sensing lines TXL may include lines that overlap each other and that are disposed in multiple layers. The first sensing lines TXL may have a structure substantially similar to the structure of the first multi-layer lines MT1.

Figure 14:
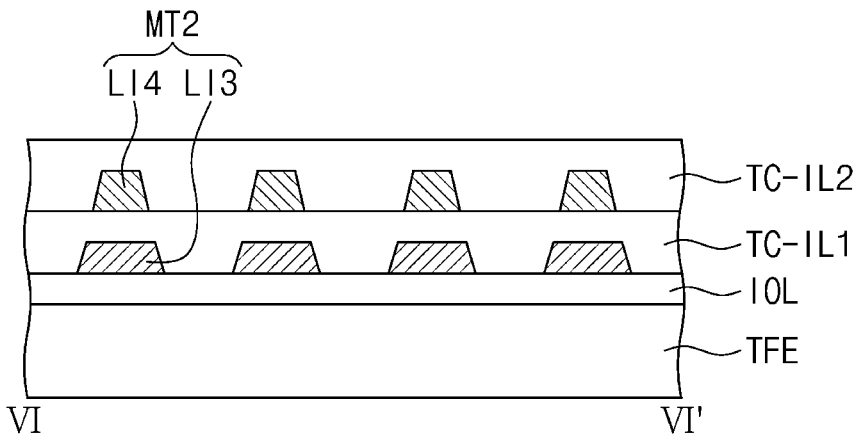
FIG. 14 is a cross-sectional view taken along line VI-VI' illustrated in FIG. 9.

FIG. 14 is a cross-sectional view taken along line VI-VI' illustrated in FIG. 9.

Referring to FIG. 14, each of the second multi-layer lines MT2 may include a third line LI3 and a fourth line LI4 disposed over the third line LI3. The third lines LI3 may be disposed on the insulating layer IOL, and the fourth lines LI4 may be disposed on the first insulating layer TC-IL1. In a plan view, the fourth lines LI4 may overlap the third lines LI3, respectively.

The third lines LI3 may be disposed in the same layer as the above-described connecting patterns CP, and the fourth lines LI4 may be disposed in the same layer as the above-described first and second sensing electrodes SE1 and SE2. In the first direction DR1, the line widths of the third lines LI3 may be greater than the line widths of the fourth lines LI4, and in the third direction DR3, the thicknesses of the fourth lines LI4 may be greater than the thicknesses of the third lines LI3.

The third lines LI3 and the fourth lines LI4 may be electrically connected in the same way as the first and second lines LI1 and LI2. For example, the fourth lines LI4 may be electrically connected to the third lines LI3 through contact holes (illustrated in FIGS. 15 and 16) that are defined in the first insulating layer TC-IL1.

Referring to FIGS. 10 and 14, the first and third lines LI1 and LI3 may be disposed in the same layer. The second and fourth lines LI2 and LI4 may be disposed in the same layer. The first and third lines LI1 and LI3 may have substantially the same structure. The second and fourth lines LI2 and LI4 may have substantially the same structure.

Figure 15:
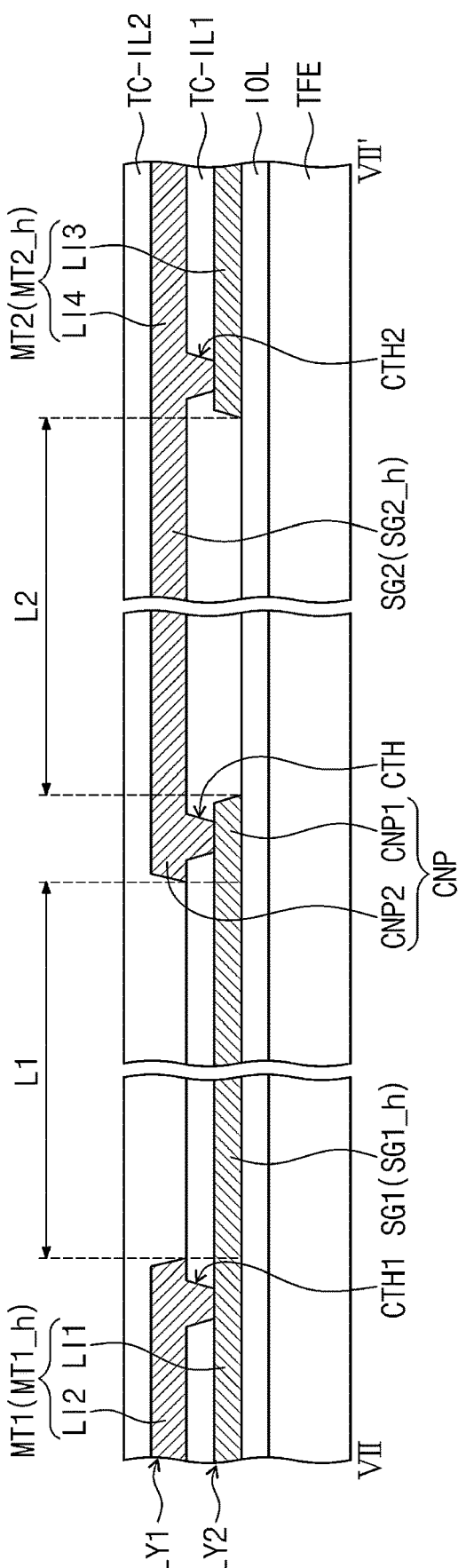
FIG. 15 is a cross-sectional view taken along line VII-VII' illustrated in FIG. 9.
Figure 16:
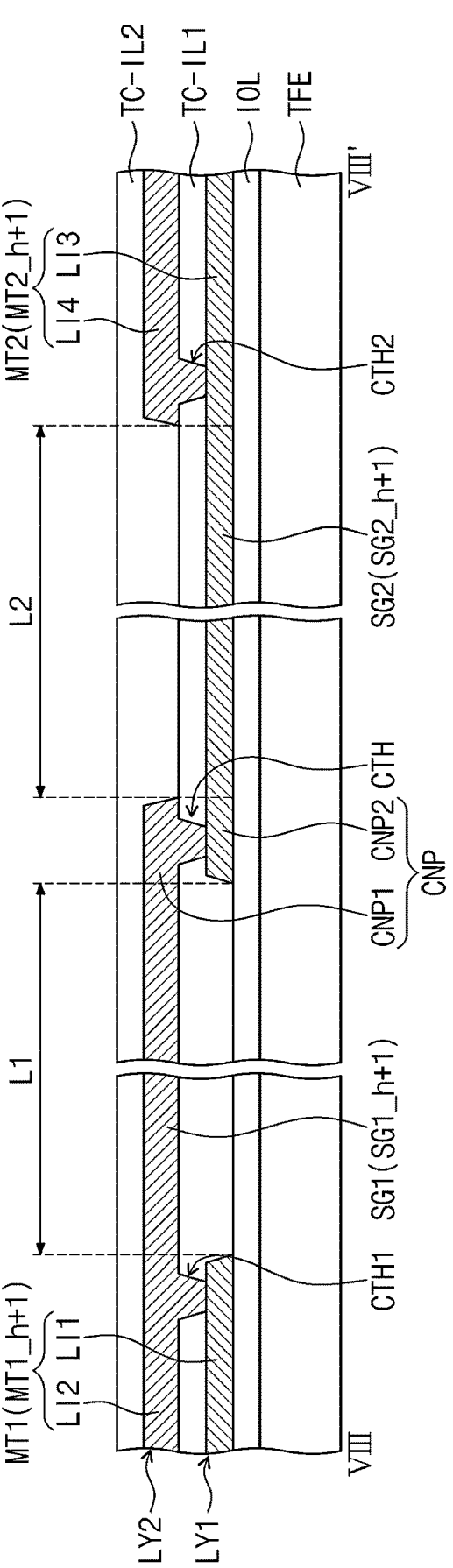
FIG. 16 is a cross-sectional view taken along line VIII-VIII' illustrated in FIG. 9.

FIG. 15 is a cross-sectional view taken along line VII-VII' illustrated in FIG. 9. FIG. 16 is a cross-sectional view taken along line VIII-VIII' illustrated in FIG. 9.

Hereinafter, the first single-layer line SG1, the second single-layer line SG2, the first multi-layer line MT1, and the second multi-layer line MT2 illustrated in FIG. 15 may be defined as the $h^{th}$ first single-layer line SG1_$h$, the $h^{th}$ second single-layer line SG2_$h$, the $h^{th}$ first multi-layer line MT1_$h$, and the $h^{th}$ second multi-layer line MT2_$h$.

The first single-layer line SG1, the second single-layer line SG2, the first multi-layer line MT1, and the second multi-layer line MT2 illustrated in FIG. 16 may be defined as the $(h+1)^{th}$ first single-layer line SG1_$h$+1, the $(h+1)^{th}$ second single-layer line SG2_$h$+1, the $(h+1)^{th}$ first multi-layer line MT1_$h$+1, and the $(h+1)^{th}$ second multi-layer line MT2_$h$+1. The $h^{th}$ lines SG1_$h$, SG2_$h$, MT1_$h$, and MT2_$h$ and the $(h+1)^{th}$ lines SG1_$h$+1, SG2_$h$+1, MT1_$h$+1, and MT2_$h$+1 may be adjacent to each other.

Referring to FIGS. 15 and 16, each of the first single-layer lines SG1 may extend from one of the first and second lines LI1 and LI2. For example, the $h^{th}$ first single-layer line SG1_$h$ may extend from the first line LI1 of the $h^{th}$ first multi-layer line MT1_$h$. For example, the $(h+1)^{th}$ first single-layer line SG1_$h$+1 may extend from the second line LI2 of the $(h+1)^{th}$ first multi-layer line MT1_$h$+1.

Each of the second single-layer lines SG2 may be disposed in a different layer from the first single-layer line SG1. Each of the second single-layer lines SG2 may be disposed in the same layer as the other one of the first and second lines LI1 and LI2. For example, the $h^{th}$ second single-layer line SG2_$h$ may be disposed in the same layer as the second line LI2 of the $h^{th}$ first multi-layer line MT1_$h$. The $(h+1)^{th}$ second single-layer line SG2_$h$+1 may be disposed in the same layer as the first line LI1 of the $(h+1)^{th}$ first multi-layer line MT1_$h$+1.

As the $h^{th}$ first single-layer line SG1_$h$ and the $h^{th}$ second single-layer line SG2_$h$ are disposed in different layers, the $h^{th}$ first single-layer line SG1_$h$ and the $h^{th}$ second single-layer line SG2_$h$ may have different widths and thicknesses as illustrated in FIGS. 12 and 13.

As the $(h+1)^{th}$ first single-layer line SG1_$h$+1 and the $(h+1)^{th}$ second single-layer line SG2_$h$+1 are disposed in different layers, the $(h+1)^{th}$ first single-layer line SG1_$h$+1 and the $(h+1)^{th}$ second single-layer line SG2_$h$+1 may have different widths and thicknesses as illustrated in FIGS. 12 and 13.

Referring to FIGS. 12, 13, 15, and 16, when the $h^{th}$ first single-layer line SG1_$h$ has a greater line width and a smaller thickness, the $h^{th}$ second single-layer line SG2_$h$ may have a smaller line width and a greater thickness. When the $(h+1)^{th}$ first single-layer line SG1_$h$+1 has a smaller line width and a greater width, the $(h+1)^{th}$ second single-layer line SG2_$h$+1 may have a greater line width and a smaller thickness. Accordingly, the line widths and thicknesses of the first single-layer lines SG1 and the second single-layer lines SG2 may have a complementary relationship.

Referring to FIGS. 15 and 16, the fourth lines LI4 may be electrically connected to the third lines LI3 through second contact holes CTH2 defined in the first insulating layer TC-IL1. Each of the second single-layer lines SG2 may extend from one of the third and fourth lines LI3 and LI4. For example, the $h^{th}$ second single-layer line SG2_$h$ may extend from the fourth line LI4 of the $h^{th}$ second multi-layer line MT2_$h$. The $(h+1)^{th}$ second single-layer line SG2_$h$+1 may extend from the third line LI3 of the $(h+1)^{th}$ second multi-layer line MT2_$h$+1.

The first single-layer line SG1 may be disposed in the same layer as the other one of the third and fourth lines LI3 and LI4. For example, the $h^{th}$ first single-layer line SG1_$h$ may be disposed in the same layer as the third line LI3 of the $h^{th}$ second multi-layer line MT2_$h$. The $(h+1)^{th}$ first single-layer line SG1_$h$+1 may be disposed in the same layer as the fourth line LI4 of the $(h+1)^{th}$ second multi-layer line MT2_$h$+1.

The second single-layer lines SG2 may be electrically connected to the first single-layer lines SG1, respectively. The second single-layer lines SG2 may be electrically connected to the first single-layer lines SG1 through contact holes CTH defined in the first insulating layer TC-IL1. The first single-layer lines SG1 may be electrically connected to the second single-layer lines SG2 by the connecting parts CNP, respectively.

Each of the connecting parts CNP may include a first connecting part CNP1 and a second connecting part CNP2. The first connecting part CNP1 may extend from a corresponding one of the first single-layer lines SG1 toward a corresponding one of the second single-layer lines SG2. The second connecting part CNP2 may extend from a corresponding one of the second single-layer lines SG2 toward a corresponding one of the first single-layer lines SG1.

The first connecting parts CNP1 may overlap the second connecting parts CNP2, respectively. The first connecting parts CNP1 may be electrically connected to the second connecting parts CNP2 through the contact holes CTH defined in the first insulating layer TC-IL1 disposed between the first connecting parts CNP1 and the second connecting parts CNP2.

The first lengths L1 of the first single-layer lines SG1 may be defined as the distances between ends of the first multi-layer lines MT1 and the connecting parts CNP. The ends of the first multi-layer lines MT1 may be defined as starting points at which a single layer starts to extend from a multi-layer. For example, the end of the second line LI2 of the $h^{th}$ first multi-layer line MT1_$h$ illustrated in FIG. 15 and the end of the first line LI1 of the $(h+1)^{th}$ first multi-layer line MT1_$h$+1 illustrated in FIG. 16 may be defined as the ends of the first multi-layer lines MT1.

The second lengths L2 of the second single-layer lines SG2 may be defined as the distances between ends of the second multi-layer lines MT2 and the connecting parts CNP. The ends of the second multi-layer lines MT2 may be defined as starting points at which a single layer starts to extend from a multi-layer. For example, the end of the third line LI3 of the $h^{th}$ second multi-layer line MT2_$h$ illustrated in FIG. 15 and the end of the fourth line LI4 of the $(h+1)^{th}$ second multi-layer line MT2_$h$+1 illustrated in FIG. 16 may be defined as the ends of the second multi-layer lines MT2. The first lengths L1 and the second lengths L2 may be substantially the same as each other.

When the second single-layer lines SG2 are not used, the first single-layer lines SG1 may extend in the second direction DR2 and may be electrically connected to the second multi-layer lines MT2. As illustrated in FIG. 12, the first single-layer lines SG1 may have different thicknesses and line widths in the first and second layers LY1 and LY2. In this case, the first single-layer line SG1 disposed in the first layer LY1 and the first single-layer line SG1 disposed in the second layer LY2 may have different resistance values. Accordingly, resistance deviations of the second sensing lines RXL may be increased.

In an embodiment of the present disclosure, the first single-layer line SG1 and the second single-layer line SG2 disposed in different layers may have the same length and may be electrically connected with each other. In addition, as described above, the line widths and the thicknesses of the first single-layer lines SG1 and the second single-layer lines SG2 may have a complementary relationship.

In this case, the resistance value formed by the $h^{th}$ first single-layer line SG1_$h$ and the $h^{th}$ second single-layer line SG2_$h$ that are electrically connected with each other in FIG. 15 may be substantially the same as the resistance value formed by the $(h+1)^{th}$ first single-layer line SG1_$h$+1 and the $(h+1)^{th}$ second single-layer line SG2_$h$+1 that are electrically connected with each other in FIG. 16. Accordingly, the resistance deviations of the second sensing lines RXL may be decreased.

As described above with reference to FIG. 9, in an embodiment of the present disclosure, the first, second, and third pitches PTH1, PTH2, and PTH3 may be equal to one another. The resistance deviations of the second sensing lines RXL may be smaller when the first, second, and third pitches PTH1, PTH2, and PTH3 are equal to one another than when the first, second, and third pitches PTH1, PTH2, and PTH3 differ from one another.

As an example of the structure in which the second sensing lines RXL extending in the second direction DR2 are divided into two, the structure of the first single-layer lines SG1 and the second single-layer lines SG2 has been described. However, the present disclosure is not necessarily limited thereto, and the second sensing lines RXL extending in the second direction DR2 may be divided into various even numbers.

For example, the second sensing lines RXL extending in the second direction DR2 may be divided into four and may be formed of first to fourth single-layer lines sequentially electrically connected. The first and third single-layer lines may have the same structure as the above-described first single-layer lines SG1, and the second and fourth single-layer lines may have the same structure as the above-described second single-layer lines SG2.

Figure 17:
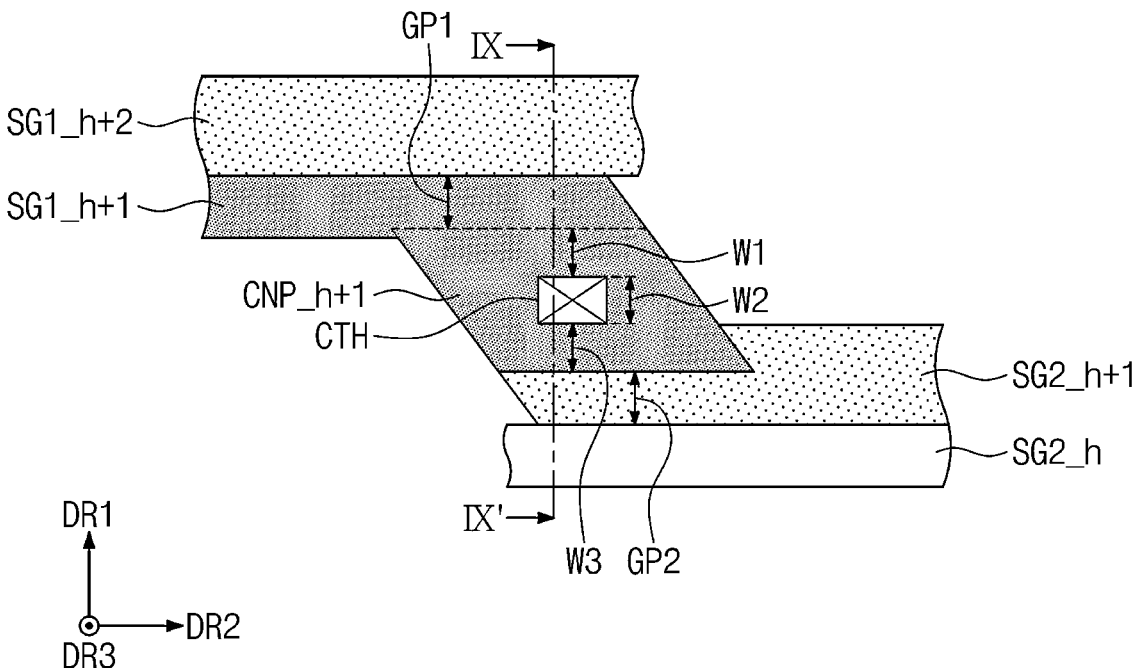
FIG. 17 is an enlarged view of one of connecting parts illustrated in FIG. 9.
Figure 18:
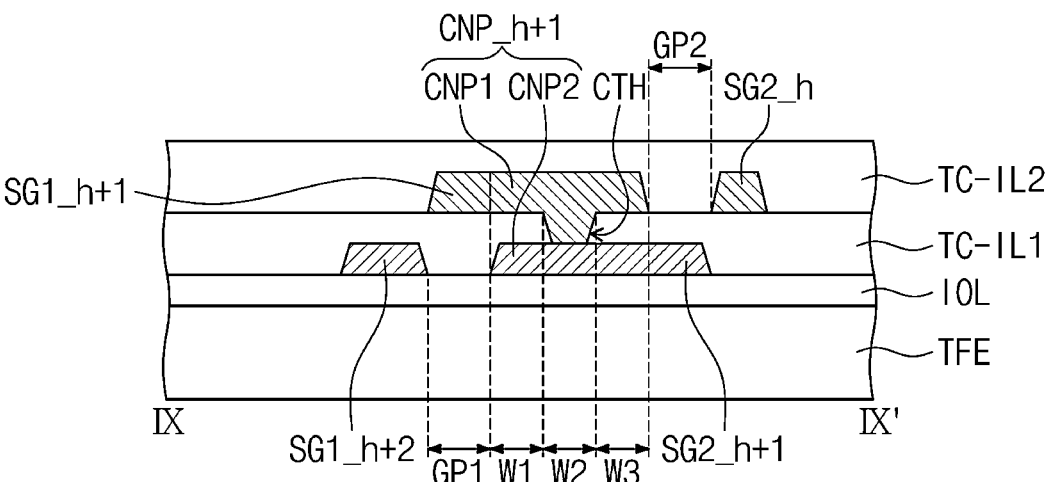
FIG. 18 is a cross-sectional view taken along line IX-IX' illustrated in FIG. 17.

FIG. 17 is an enlarged view of one of the connecting parts illustrated in FIG. 9. FIG. 18 is a cross-sectional view taken along line IX-IX' illustrated in FIG. 17.

In FIG. 17, the third connecting part CNP from the top among the connecting parts CNP is illustrated. However, the other connecting parts CNP may have the same structure as the connecting part CNP illustrated in FIG. 17.

Hereinafter, the connecting part CNP illustrated in FIG. 17 and the first and second single-layer lines SG1 and SG2 electrically connected to the connecting part CNP are defined as the $(h+1)^{th}$ connecting part CNP_h+1 and the $(h+1)^{th}$ first and second single-layer lines SG1_$h$+1 and SG2_$h$+1.

Referring to FIGS. 17 and 18, the $(h+1)^{th}$ connecting part CNP_h+1 may include a first connecting part CNP1 extending from the $(h+1)^{th}$ first single-layer line SG1_$h$+1 and a second connecting part CNP2 extending from the $(h+1)^{th}$ second single-layer line SG2_$h$+1. The $(h+1)^{th}$ connecting part CNP_h+1 may be defined as a portion where the first and second connecting parts CNP1 and CNP2 overlap each other. For example, the $(h+1)^{th}$ connecting part CNP_h+1 may have a parallelogram shape.

The width between one side of the $(h+1)^{th}$ connecting part CNP_h+1 and the contact hole CTH in the first direction DR1 may be defined as a first width W1. The width of the contact hole CTH in the first direction DR1 may be defined as a second width W2. The width between an opposite side of the $(h+1)^{th}$ connecting part CNP_h+1 and the contact hole CTH in the first direction DR1 may be defined as a third width W3. The one side and the opposite side of the $(h+1)^{th}$ connecting part CNP_h+1 may extend in the second direction DR2 and may face away from each other in the first direction DR1.

The first width W1, the second width W2, and the third width W3 may be equal to one another. The sum of the first width W1, the second width W2, and the third width W3 may be set to 9 micrometers (μm) to 10 micrometers (μm). The first width W1, the second width W2, and the third width W3 may preferably be set to 3 micrometers (μm).

In the first direction DR1, the gap between the one side of the $(h+1)^{th}$ connecting part CNP_h+1 facing the $(h+2)^{th}$ first single-layer line SG1_$h$+2 and the $(h+2)^{th}$ first single-layer line SG1_$h$+2 may be defined as a first gap GP1. In the first direction DR1, the gap between the opposite side of the $(h+1)^{th}$ connecting part CNP_h+1 facing the $h^{th}$ second single-layer line SG2_$h$ and the $h^{th}$ second single-layer line SG2_$h$ may be defined as a second gap GP2.

The first gap GP1 and the second gap GP2 may be equal to each other in size. The first gap GP1 and the second gap GP2 may be set to 3.5 micrometers (μm) to 4 micrometers (μm). The first gap GP1 and the second gap GP2 may preferably be set to 3.5 micrometers (μm).

When the first gap GP1 and the second gap GP2 are less than 3.5 micrometers (μm), the one side of the $(h+1)^{th}$ connecting part CNP_h+1 and the $(h+2)^{th}$ first single-layer line SG1_$h$+2 may be more likely to be electrically shorted (i.e., short circuited) to each other, and the opposite side of the $(h+1)^{th}$ connecting part CNP_h+1 and the $h^{th}$ second single-layer line SG2_$h$ may be more likely to be electrically shorted to each other. When the first gap GP1 and the second gap GP2 are 3.5 micrometers (μm) or more, the one side of the $(h+1)^{th}$ connecting part CNP_h+1 and the $(h+2)^{th}$ first single-layer line SG1_$h$+2 may be less likely to be electrically shorted to each other, and the opposite side of the $(h+1)^{th}$ connecting part CNP_h+1 and the $h^{th}$ second single-layer line SG2_$h$ may be less likely to be electrically shorted to each other.

Figure 19:
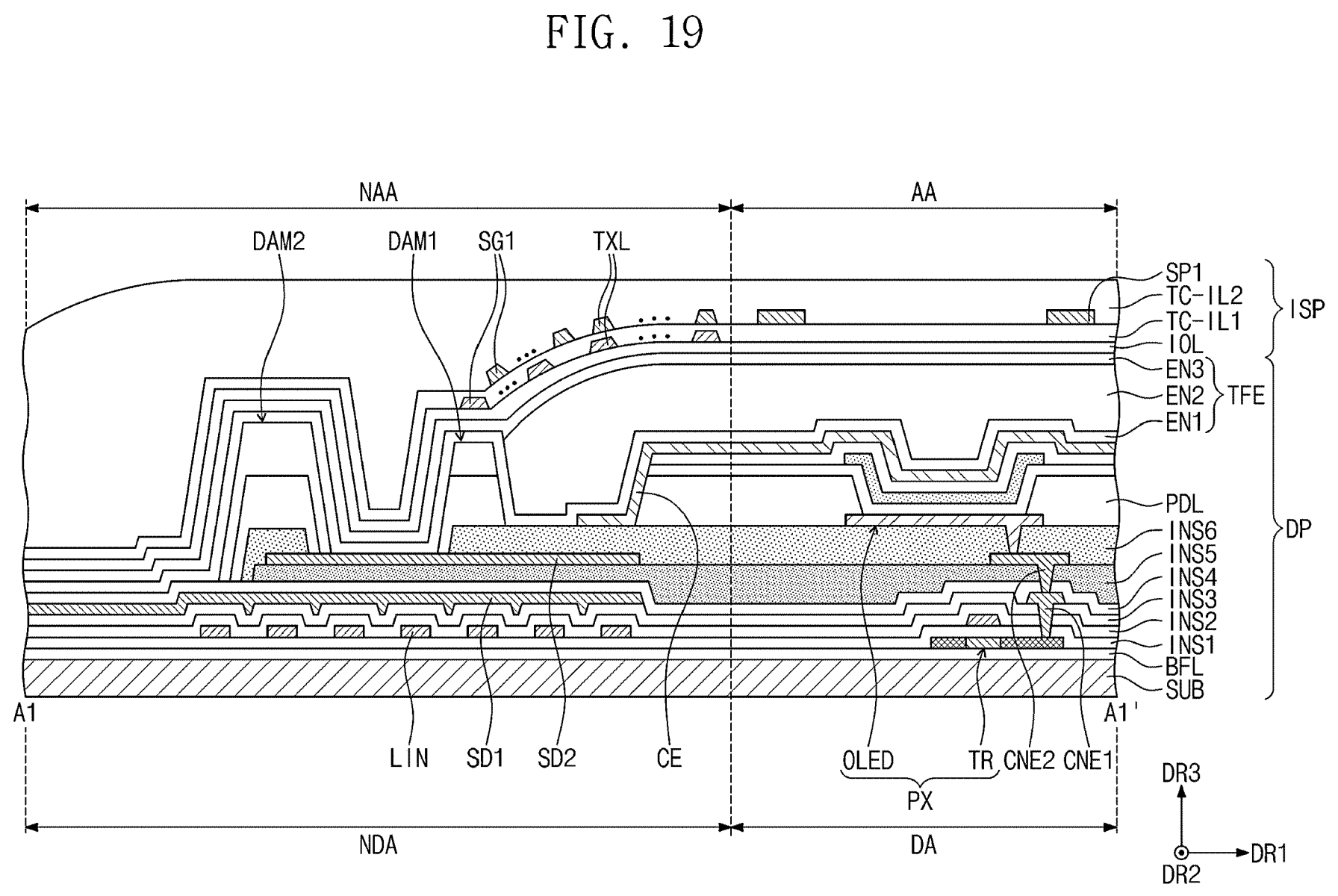
Figure 20:
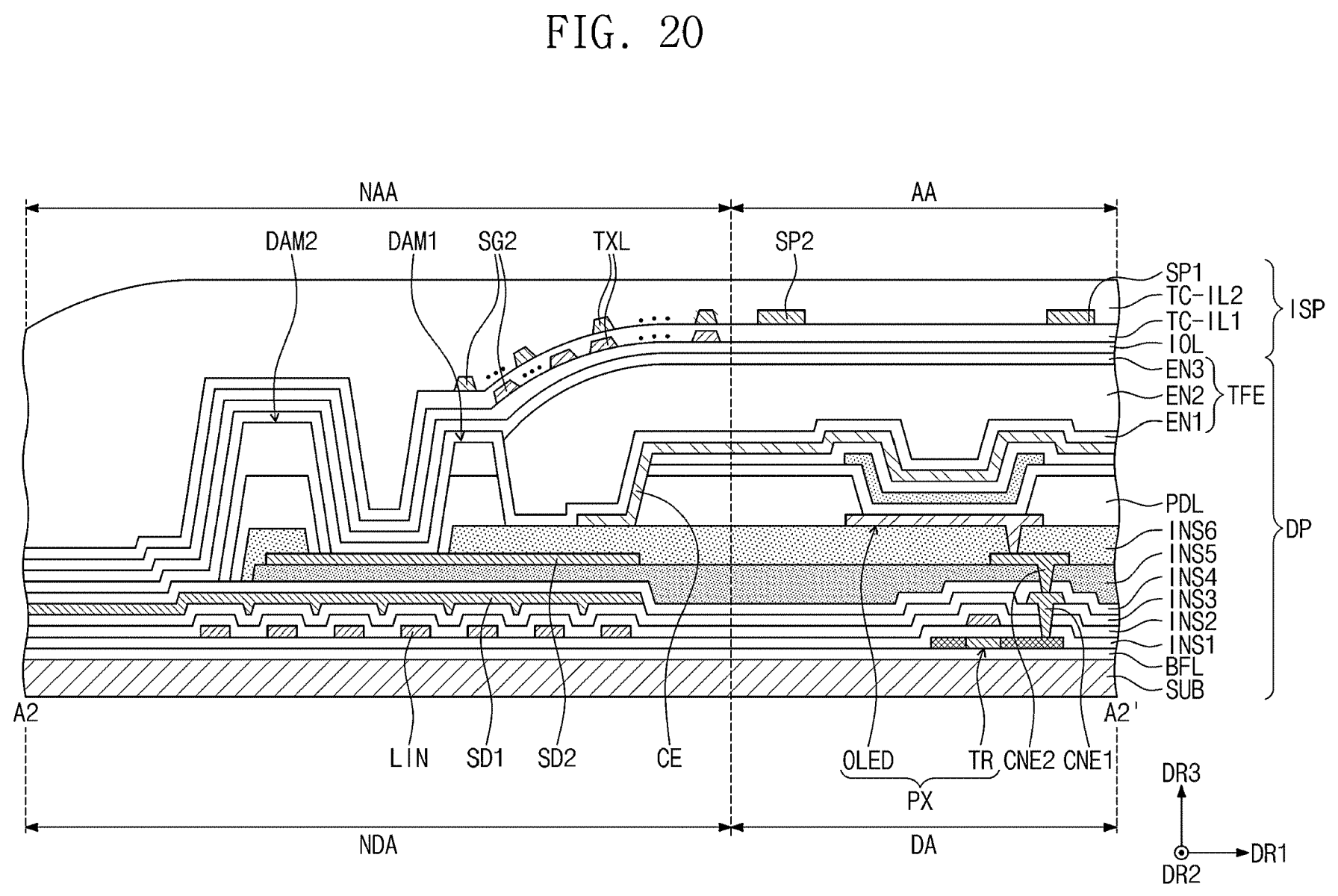

FIG. 19 is a cross-sectional view taken along line A1-A1' illustrated in FIG. 6. FIG. 20 is a cross-sectional view taken along line A2-A2' illustrated in FIG. 6.

Referring to FIGS. 19 and 20, the first to fourth insulating layers INS1 to INS4 may extend to the non-display area NDA. The fifth insulating layer INS5 and the sixth insulating layer INS6 may extend to a particular portion of the non-display area NDA. The pixel defining film PDL may be disposed on a portion of the non-display area NDA that is adjacent to the display area DA.

A plurality of line patterns LIN may be disposed in the non-display area NDA. The line patterns LIN may be disposed on the first insulating layer INS1, and the second insulating layer INS2 may be disposed on the line patterns LIN. The line patterns LIN may form the first and second control lines CSL1 and CSL2 and the data lines DL1 to DLn illustrated in FIG. 4.

A first conductive pattern SD1 may be disposed on the third insulating layer INS3, and a second conductive pattern SD2 may be disposed on the fifth insulating layer INS5. The first and second conductive patterns SD1 and SD2 may be electrically connected with the power line.

A first dam DAM1 and a second dam DAM2 spaced apart from each other may be disposed in the non-display area NDA. The first and second dams DAM1 and DAM2 may be disposed on the fifth insulating layer INS5. The first dam DAM1 may be adjacent to the display area DA, and the second dam DAM2 may be spaced farther away from display area DA than the first dam DAM1. Each of the first and second dams DAM1 and DAM2 may include a plurality of layers stacked one above another. For example, the height of the second dam DAM2 may be greater than the height of the first dam DAM1.

The first encapsulation layer EN1 disposed on the pixel PX may extend toward the non-display area NDA and may be disposed on the first and second dams DAM1 and DAM2. The second encapsulation layer EN2 may be disposed on the non-display area NDA adjacent to the display area DA. The second encapsulation layer EN2 may be disposed on the first dam DAM1. The third encapsulation layer EN3 may be disposed on the first encapsulation layer EN1 and may cover the second encapsulation layer EN2.

The second encapsulation layer EN2 may be formed by curing an organic material having fluidity. The organic material having fluidity may be blocked by the first dam DAM1 even though flowing toward the non-display area NDA. The second dam DAM2 may additionally block the organic material flowing over the first dam DAM1.

The first single-layer lines SG1, the first sensing lines TXL, and the first sensing part SP1 may be disposed over the thin-film encapsulation layer TFE. The first single-layer lines SG1 may start to be disposed from above the first dam DAM1.

Referring to FIGS. 12 and 19, the first single-layer lines SG1 may start to be alternately disposed in the first layer LY1 and the second layer LY2 from above the first dam DAM1. The first sensing lines TXL may include multi-layer lines overlapping each other.

Referring to FIGS. 13 and 20, in contrast to the first single-layer lines SG1, the second single-layer lines SG2 may start to be alternately disposed in the second layer LY2 and the first layer LY1 from above the first dam DAM1.

According to the embodiments of the present disclosure, the single-layer lines may be alternately disposed in a single layer in a portion of the non-active area, and thus the non-active area may be reduced. Furthermore, the lengths of the first single-layer lines and the second single-layer lines electrically connected with each other may be set to be the same as each other, and thus resistance deviations between the $h^{th}$ first and second single-layer lines electrically connected with each other and the $(h+1)^{th}$ first and second single-layer lines electrically connected with each other may be decreased.

In addition, the gaps between the sides of the connecting parts, the gaps between the sides of the bent portions between the first multi-layer lines and the first single-layer lines, and the gaps between the sides of the second multi-layer lines may be set to be the same as one another, and thus resistance deviations in the second sensing lines may be further decreased.

While the present disclosure has been described with reference to embodiments thereof, it will be apparent to those of ordinary skill in the art that various changes and modifications may be made thereto without departing from the spirit and scope of the present disclosure.

What is claimed is:

1. An input sensing part, comprising:
   a plurality of first sensing electrodes;
   a plurality of second sensing electrodes crossing the first sensing electrodes;
   a plurality of first sensing lines electrically connected to the first sensing electrodes;
   a plurality of first multi-layer lines electrically connected to the second sensing electrodes;
   a plurality of first single-layer lines extending from the first multi-layer lines, arranged in a first direction, and extending in a second direction crossing the first direction; and
   a plurality of second single-layer lines disposed in a different layer from the first single-layer lines, arranged in the first direction, and extending in the second direction; and, a plurality of connecting parts electrically connecting the first single-layer lines to the second single-layer lines,
   wherein the connecting parts are arranged in a first diagonal direction crossing the first and second directions.

2. The input sensing part of claim 1, wherein a space between connecting parts adjacent to each other among the connecting parts has a shape extending in a second diagonal direction crossing the first diagonal direction.

3. The input sensing part of claim 1, wherein each of the second single-layer lines has a different line width from that of each of the first single-layer lines.

4. The input sensing part of claim 1, wherein each of the first multi-layer lines includes:
   a first line; and
   a second line disposed over the first line,
   wherein each of the first single-layer lines extends from either a first line or a second line of a corresponding first multi-layer line among the first multi-layer lines.

5. The input sensing part of claim 4, wherein each of the second single-layer lines is disposed in a same layer as the first line or the second line that each of the first single-layer lines does not extend from.

6. The input sensing part of claim 4, wherein each of the second single-layer lines has a different thickness from that of each of the first single-layer lines.

7. The input sensing part of claim 4, further comprising:
   a plurality of second multi-layer lines,
   wherein each of the second multi-layer lines includes:
      a third line; and
      a fourth line that is disposed over the third line,
   wherein each of the second single-layer lines extends from either the third line or the fourth line, and
   wherein the first and second multi-layer lines extend in the first direction, and the first and second single-layer lines are bent from the first and second multi-layer lines, respectively, and extend in the second direction.

8. The input sensing part of claim 7, wherein the first line is disposed in a same layer as the third line, and the second line is disposed in a same layer as the fourth line.

9. The input sensing part of claim 7, wherein each of the first single-layer lines is disposed in a same layer as the third line or the fourth line that each of the second single-layer lines does not extend from.

10. The input sensing part of claim 7,
   wherein each of the connecting parts includes:
      a first connecting part extending from each of the first single-layer lines toward each of the second single-layer lines; and
      a second connecting part extending from each of the second single-layer lines toward each of the first single-layer lines, electrically connected to the first connecting part, and at least partially overlapping the first connecting part.

11. The input sensing part of claim 10, wherein a length of each of the first single-layer lines, defined as a distance between an end of each of the first multi-layer lines and each of the connecting parts, is equal to a length of each of the second single-layer lines, defined as a distance between an end of each of the second multi-layer lines and each of the connecting parts.

12. The input sensing part of claim 10, wherein the first connecting part is electrically connected to the second connecting part through a contact hole defined in an insulating layer disposed between the first connecting part and the second connecting part,
   wherein a first width between one side of each of the connecting parts and the contact hole in the first direction, a second width of the contact hole in the first direction, and a third width between an opposite side of each of the connecting parts and the contact hole in the first direction are equal to one another.

13. The input sensing part of claim 12, wherein each of the first, second, and third widths is equal to 3 micrometers.

14. The input sensing part of claim 10, wherein the first and second multi-layer lines are arranged in the second direction,
   wherein an $h^{th}$ first single-layer line extends from a first line of an $h^{th}$ first multi-layer line, and an $h^{th}$ second single-layer line extends from a fourth line of an $h^{th}$ second multi-layer line, and
   wherein an $(h+1)^{th}$ first single-layer line extends from a second line of an $(h+1)^{th}$ first multi-layer line, and an $(h+1)^{th}$ second single-layer line extends from a third line of an $(h+1)^{th}$ second multi-layer line, wherein h is a positive integer.

15. The input sensing part of claim 14, wherein in the second direction, a gap between one side of an $h^{th}$ connecting part and one side of an $(h+1)^{th}$ connecting part is equal in size to a gap between one side of a bent portion between the $h^{th}$ first multi-layer line and the $h^{th}$ first single-layer line and one side of a bent portion between the $(h+1)^{th}$ first multi-layer line and the $(h+1)^{th}$ first single-layer line.

16. The input sensing part of claim 14, wherein in the second direction, a gap between one side of an $h^{th}$ connecting part and one side of an $(h+1)^{th}$ connecting part is equal in size to a gap between one side of the $h^{th}$ second multi-layer line and one side of the $(h+1)^{th}$ second multi-layer line.

17. The input sensing part of claim 14, wherein in the first direction, a first gap between one side of an $(h+1)^{th}$ connecting part facing an $(h+2)^{th}$ first single-layer line and the $(h+2)^{th}$ first single-layer line is equal in size to a second gap between an opposite side of the $(h+1)^{th}$ connecting part facing the $h^{th}$ second single-layer line and the $h^{th}$ second single-layer line.

18. The input sensing part of claim 17, wherein each of the first and second gaps is 3.5 micrometers in length.

19. The input sensing part of claim 4, wherein each of the first single-layer lines includes:

a first part extending from each of the first multi-layer lines in the second direction; and a second part electrically connected to each of the second single-layer lines and extending in the second direction after being bent from the first part in a diagonal direction crossing the first and second directions.

20. The input sensing part of claim 19, wherein each of the first sensing lines includes:

a third part adjacent to the first part and extending in the second direction; and a fourth part adjacent to the second part and extending in the second direction after being bent from the third part in the diagonal direction.

21. The input sensing part of claim 20, wherein the fourth part has a smaller line width, in the first direction, than that of the third part, in the first direction.

* * * * *